United States Patent
Chen

(10) Patent No.: US 10,152,154 B2
(45) Date of Patent: Dec. 11, 2018

(54) 3D INTERACTION METHOD AND DISPLAY DEVICE

(71) Applicant: SUPERD TECHNOLOGY CO., LTD., Shenzhen (CN)

(72) Inventor: Liang Chen, Shenzhen (CN)

(73) Assignee: SUPERD TECHNOLOGY CO., LTD., Shenzhen (CN)

(*) Notice: Subject to any disclaimer, the term of this patent is extended or adjusted under 35 U.S.C. 154(b) by 167 days.

(21) Appl. No.: 14/986,945

(22) Filed: Jan. 4, 2016

(65) Prior Publication Data

US 2016/0219270 A1    Jul. 28, 2016

(30) Foreign Application Priority Data

Jan. 22, 2015   (CN) .................... 2015 1 0033148
Jan. 22, 2015   (CN) .................... 2015 1 0033677

(51) Int. Cl.

| | |
|---|---|
| G02B 27/22 | (2018.01) |
| H04N 13/00 | (2018.01) |
| G06F 3/041 | (2006.01) |
| G06F 3/0488 | (2013.01) |
| G06F 3/0484 | (2013.01) |
| H04N 13/128 | (2018.01) |
| H04N 13/30 | (2018.01) |

(52) U.S. Cl.
CPC .......... *G06F 3/0412* (2013.01); *G06F 3/0488* (2013.01); *G06F 3/04845* (2013.01); *G06F 2203/04101* (2013.01); *H04N 13/128* (2018.05); *H04N 13/30* (2018.05)

(58) Field of Classification Search
CPC .......... H04N 13/0425; H04N 13/0409; H04N 13/0468; H04N 13/0497; H04N 13/0033; H04N 13/0022; G06F 3/0412
USPC ............................................................. 348/51
See application file for complete search history.

(56) References Cited

U.S. PATENT DOCUMENTS

2011/0298791 A1* 12/2011 Adachi .............. H04N 13/0003
                                                                    345/419

* cited by examiner

*Primary Examiner* — Hee-Yong Kim
(74) *Attorney, Agent, or Firm* — Anova Law Group, PLLC

(57) ABSTRACT

The present disclosure provides a 3D interaction method. The 3D display device detects a distance between an operating element and a display screen and checks whether the distance is less than a maximum distance of a 3D image pointed by the operating element protruding out of the display screen. When the distance is less than the maximum protruding distance of the 3D image pointed by the operating element, the 3D display device acquires a viewing distance between a viewer and the display screen. Based on the acquired viewing distance and the distance between the operating element and the display screen, the 3D display device adjusts the parallax of the 3D image pointed by the operating element to cause an actual distance of the 3D image pointed by the operating element protruding out of the display screen equal to the distance between the operating element and the display screen.

20 Claims, 14 Drawing Sheets

3D INTERACTION METHOD AND DISPLAY DEVICE

CROSS-REFERENCES TO RELATED APPLICATIONS

This application claims the priority of Chinese Patent Application No. CN201510033148.X, filed on Jan. 22, 2015, and Chinese Patent Application No. CN201510033677.X, filed on Jan. 22, 2015, the entire contents of both of which are incorporated herein by reference.

FIELD OF THE DISCLOSURE

The present disclosure generally relates to the field of 3D display technologies and, more particularly, relates to a 3D interaction method and display device.

BACKGROUND

In order to break through the constraints of flat panel display, the 3D display technologies have recently made significant progresses. At the same time, a variety of 3D interaction solutions have been proposed. However, majority of the proposed solutions simply covert the images for flat panel display into the images for 3D display while no consideration has been given to the interaction method under the 3D display circumstances. Especially, when the touch screens are the current mainstream means for interaction, when an operating element (for example, a finger or a stylus) touches and controls a 3D image displayed on a touch screen, a viewer often has an illusion that the operating element passes through the perceived 3D object, as shown in FIG. 1. Such illusion gives the viewer dizziness, falseness, and other unpleasant experience.

To solve this problem, some solutions have been proposed to adjust the viewing parallax of the 3D images based on the distance between the operating element and the touch screen to improve the unpleasant experience.

However, the method of adjusting the viewing parallax of the 3D images based on the distance between the operating element and the touch screen only solves the problem in 3D interaction to a certain extent. Such method often does not completely solve the 3D interaction problem, and the effectiveness of such method is more limited especially when the viewing position of the viewer changes or the resolution and the dimension of the display device changes.

The disclosed 3D interaction method and display device are directed to solve one or more problems set forth above and other problems in the art.

BRIEF SUMMARY OF THE DISCLOSURE

Directed to solve one or more problems set forth above and other problems in the art, the present disclosure provides a 3D interaction method and display device to improve viewing experience.

One aspect of the present disclosure includes a 3D interaction method for displaying 3D images on a 3D display device. The method includes the following steps. The 3D display device detects a distance between an operating element and a display screen of the 3D display device. The 3D display device determines whether the distance between the operating element and the display screen is less than a maximum distance of a 3D image pointed by the operating element protruding out of the display screen. When the distance between the operating element and the display screen is less than a maximum distance, the 3D display device acquires a viewing distance between a viewer and the display screen. Based on the acquired viewing distance and the distance between the operating element and the display screen, the 3D display device adjusts a parallax of the 3D image pointed by the operating element to cause an actual distance of the 3D image pointed by the operating element protruding out of the display screen equal to the distance between the operating element and the display screen.

Another aspect of the present disclosure provides a 3D display device for displaying 3D images. The 3D display device includes a plurality of floating touch sensors configured to detect a distance between an operating element and a display screen, a spatial distance detector configured to acquire a viewing distance between a viewer and the display screen, a 3D display screen configured to display 3D images, and at least one processor configured to determine whether the distance between the operating element and the display screen is less than a maximum distance of a 3D image pointed by the operating element protruding out of the display screen and, based on the viewing distance acquired by the spatial distance detector and the distance detected by the plurality of floating touch sensors, to adjust a parallax of a 3D image pointed by the operating element to cause the actual distance of the 3D image pointed by the operating element protruding out of the display screen equal to the distance between the operating element and the display screen.

Another aspect of the present disclosure includes a 3D interaction method for displaying 3D images on a 3D display device. The method includes the following steps. The 3D display device acquires an initial distance of a 3D image displayed on a display screen protruding out of the display screen. The 3D display device calculates a first viewing distance corresponding to a first viewing position based on the initial distance of the 3D image protruding out of the display screen. When a viewer appears at a second viewing position different from the first viewing position, the 3D display device acquires a second viewing distance between the viewer and the display screen. Based on the acquired second viewing distance and the initial distance of the 3D image protruding out of the display screen, the 3D display device adjusts a parallax of the 3D image displayed on the display screen to cause the distance of the 3D image protruding out of the display screen equal to the initial distance.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 2:
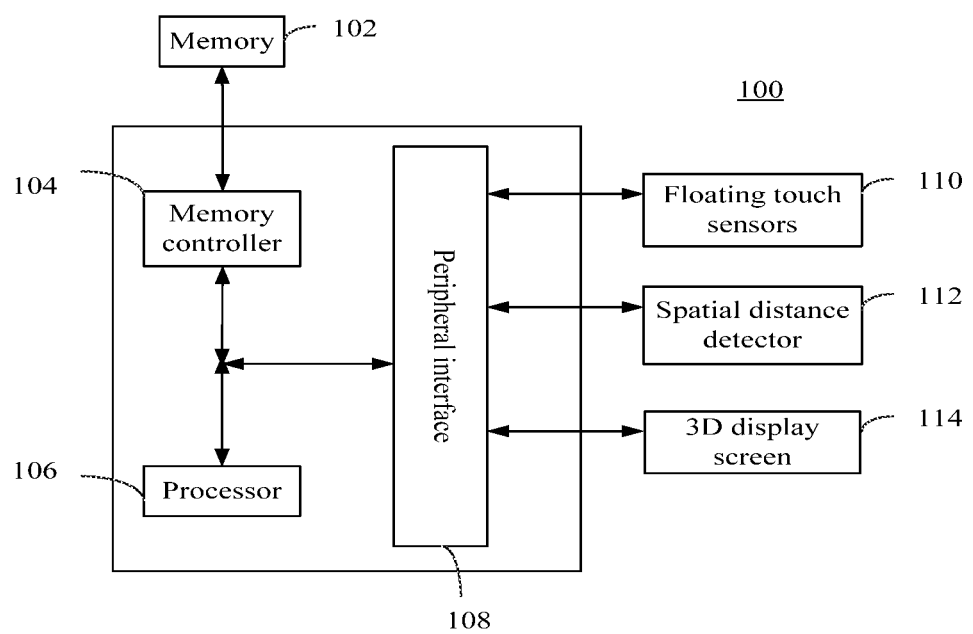
FIG. 2 illustrates a block diagram of an exemplary 3D display device according to the disclosed embodiments.

FIG. 2 illustrates a block diagram of an exemplary 3D display device according to the present disclosure. Referring to FIG. 2, a 3D display device 100 includes a memory 102, a memory controller 104, one or more processors 106 (only one shown in FIG. 2), a peripheral interface 108, a plurality of floating touch sensors 110, a spatial distance detector 112, and a 3D display screen 114.

The structure shown in FIG. 2 is only for illustration purpose. The 3D display device 100 may also include more or less components than as shown in FIG. 2, or may include different components. The components shown in FIG. 2 may be implemented in hardware, software or combination of both hardware and software.

The memory 102 may be used to store software programs and modules. In one embodiment, the software programs and modules for the 3D interaction process and display device may be stored in the memory 102. The processor 106 may run the software programs and modules stored in the memory 102 to execute the various application functions and data processing for the disclosed 3D interaction method and display device.

The memory 102 may include high speed random access memory. The memory 102 may also include non-volatile memory such as one or more magnetic storage devices, flash memory, or other non-volatile solid state memory devices. In certain embodiments, the memory 102 may further include memory configured remotely from the processors 106. The processor(s) 106 and other memory accessing components may access the memory 102 under the control of the memory controller 104.

The peripheral interface 108 may connect various input and output devices to the processor 106 and the memory 102. The processor 106 may run the various software programs and modules to execute the functions of the 3D display device 100 and to perform data processing.

In certain embodiments, the peripheral interface 108, the processor 106, and the memory controller 104 may be implemented by a single chip. In certain other embodiments, the peripheral interface 108, the processor 106, and the memory controller 104 may be implemented by individual chips respectively.

The plurality of the floating touch sensors 110 may be configured to sense the 3D position of an operating element (e.g., a finger, a stylus or other suitable operating element) in the interactive operations and the distance between the operating element and the 3D display screen 114. For example, the floating touch sensors 110 may be a plurality of infrared sensors or other spatial sensing devices that are configured at the periphery of the 3D display screen 114.

The spatial distance detector 112 may be configured to acquire the viewing distance between the viewing position of the viewer and the 3D display screen 114. Specifically, the viewing distance may be the vertical distance between the viewer and the 3D display screen 114. The spatial distance detector 112 may be an image acquisition device or other suitable distance detector.

The spatial distance detector 112 may include, but is not limited to, a camera, an infrared detector, or other suitable devices. From the practicality perspective, such devices may need to have a certain detection range of capability and precision when acquiring the position information. It is undesired to have the detection range too wide or too narrow. From the 3D display effect perspective, when the displacement is too large, the image may be severely stretched and distorted. In one embodiment, the 3D display device may be most effective when the viewer operates the 3D display device within the normal operating range.

The 3D display screen 114 may be used to display 3D images. In one embodiment, the 3D display screen 114 may be a touch control screen or touch screen configured to provide the viewer an input/output interface. Specifically, the 3D display screen 114 may display video contents outputted to the viewer. The video contents may include any one or combination of texts, graphics, and videos. Some display contents may be tailored to certain viewer of the 3D display screen 114. Certain output on the 3D display screen may correspond to certain viewer interaction objects.

The 3D display screen 114 may also accept certain input by the touch gestures of the viewer. For example, the touch gestures may include click operations or slide operation on the touch screen. The user interface object may respond to the viewer's input. The touch control technologies for detecting the viewer input may include resistive, capacitive, or other suitable touch control types. The 3D display screen 114 may include, but is not limited to, liquid crystal display or light emitting polymer display.

Figure 3:
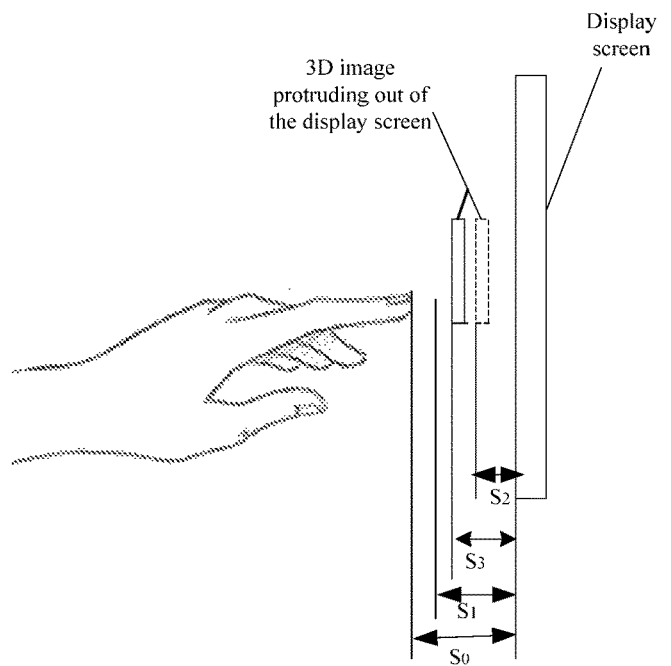
FIG. 3 illustrates a schematic view of an exemplary 3D interaction according to the disclosed embodiments.
Figure 4:
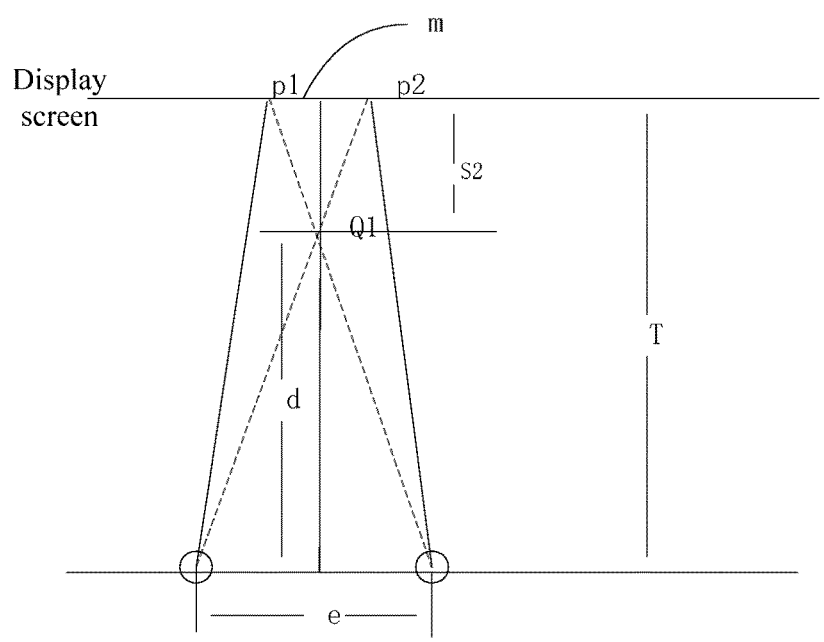
FIG. 4 illustrates a schematic view of certain distance determination of an exemplary 3D interaction according to the disclosed embodiments.

FIGS. 3-4 illustrate a 3D interaction scenario with definitions of the labels involved in the technical solutions of the present disclosure. The same label is uniquely defined throughout the various embodiments.

As shown in FIG. 3, an operating element (e.g., a finger) is used by the viewer to interact with a 3D image displayed on a display screen 114. $S_0$ is the maximum sensing distance of the floating touch sensor 110 of the 3D display device. $S_0$ is determined by the sensing capability of the floating touch sensor 110.

$S_1$ is the distance between the operating element and the 3D display screen 114. When $S_1$ is greater than $S_0$, the floating touch sensor is no longer able to sense the presence of the operating element. When $S_1$ is equal to or smaller than $S_0$, $S_1$ reflects the real-time measurement of the floating touch sensor 110.

$S_2$ is the actual distance that the 3D image displayed on the 3D display screen 114 (the dash line portion of the 3D image in FIG. 3) protrudes out of the 3D display screen 114.

$S_3$ is the maximum distance that the 3D image displayed on the 3D display screen 114 (the solid line portion of the 3D image in FIG. 3) protrudes out of the 3D display screen 114. $S_3$ is determined by the parallax-distance conversion module of the 3D display device. $S_3$ is greater than $S_2$.

As shown in FIG. 4, T is the viewing distance of the viewer with respect to the display screen 114. $S_3$ is determined by calculating the position of a point in the object of the 3D image based on the parallax for the point on the 3D display screen 114 corresponding to the location of the operating element, the viewing position of the viewer, and the viewing distance of the viewer T. $S_3$ is the maximum distance of any point in the object of the 3D image from the display screen.

FIG. 4 also illustrates the calculation of $S_2$, the actual distance that the 3D image displayed on the 3D display screen 114 protrudes out of the 3D display screen 114. Referring to FIG. 4, m is the absolute parallax of the same point on the left view image (i.e., the left parallax view image or the left eye parallax view image) and the right view image (i.e., the right parallax view image or the right eye parallax view image), or the absolute distance between two pixels p1 and p2 displayed on the 3D display screen 114 corresponding to the same point. The pixels p1 and p2 are located in the plane where the 3D display screen 114 is. e is the interpupillary distance (generally using the default value) of the eyes of the viewer. The parallax m forms the image $Q_1$ protruding out of the 3D display screen 114. d is the distance between the image $Q_1$ and the plane where the eyes of the viewer is located. The distance between the image $Q_1$ and the plane where the 3D display screen 114 is located is $S_2$ in FIG. 3. T is the distance between the viewer and the plane where the 3D display screen 114 is located, or the viewing distance of the viewer.

According to the principle of similar triangles, as shown in FIG. 4, equation (1) below is given as:

$$\frac{S_2}{T-S_2} = \frac{m}{e} \qquad (1)$$

In the above equation (1), the interpupillary distance of the eyes of the viewer e is a constant. Thus, $S_2$, the actual distance that the 3D image displayed on the 3D display screen 114 protrudes out of the 3D display screen 114 is determined by the 3D image parallax m and the viewing distance of the viewer T.

Figure 1:
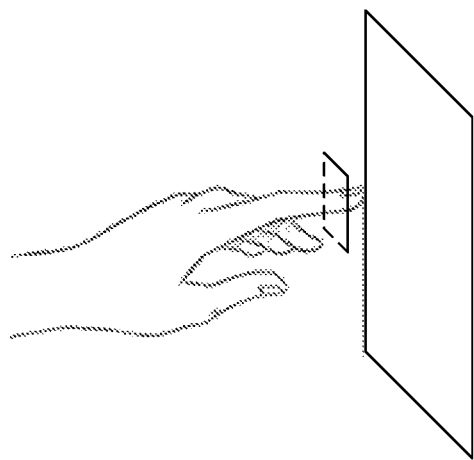
FIG. 1 illustrates a schematic view of an operating element passing through a 3D image pointed by the operating element protruding out of a display screen in a 3D interaction.
Figure 5:
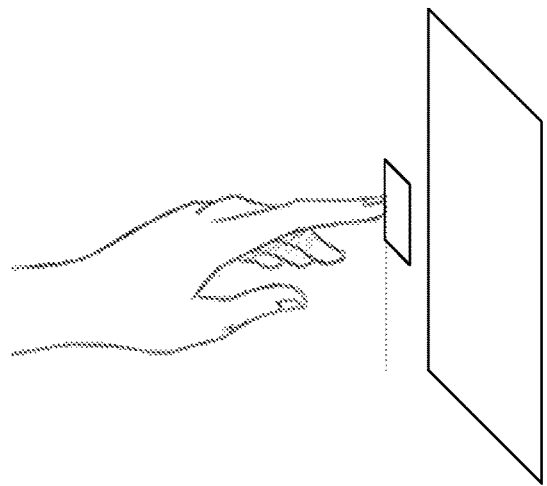
FIG. 5 illustrates a schematic view of the operating element touching a 3D image in a 3D interaction.

To avoid the illusion of the operating element passing through the 3D image (as shown in FIG. 1) and to assure the effect of the operating element pressing down the 3D image (as shown in FIG. 5), $S_2$ may be equal to $S_1$. In other words, the actual distance that the 3D image displayed on the 3D display screen 114 protrudes out of the 3D display screen 114 may be equal to the distance between the operating element and the 3D display screen 114 during the 3D interaction. When $S_2$ is equal to $S_1$, equation (2) below is given.

$$S_2 = S_1 = mT/(m+e) \qquad (2)$$

Figure 6:
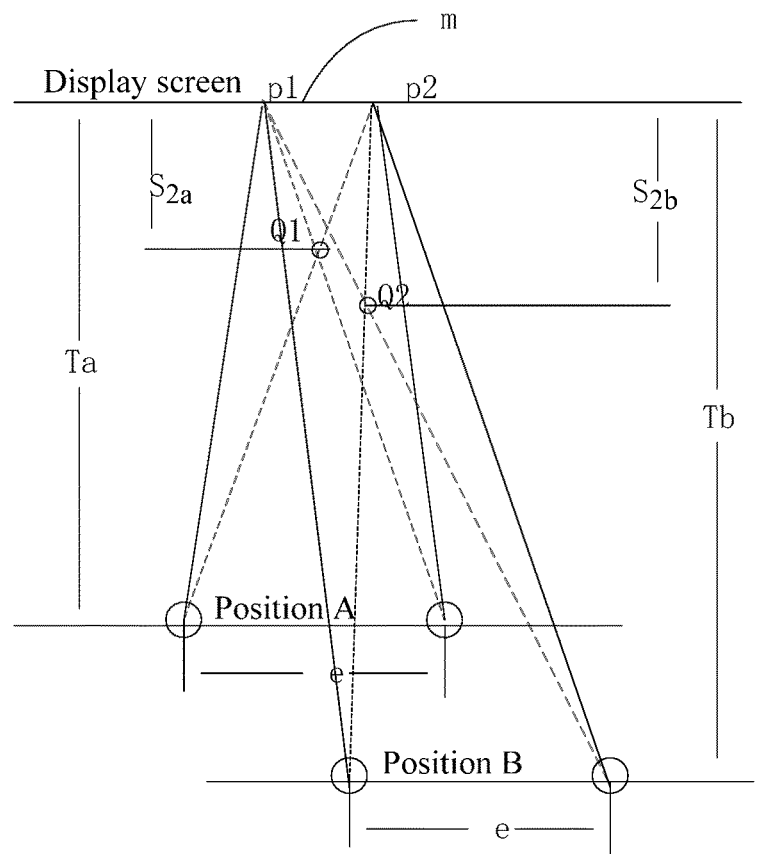
FIG. 6 illustrates a schematic view of a viewing distance of the viewer affecting the actual distance of a 3D image protruding out of the display screen according to the disclosed embodiments.

Further, when displayed on display screens with different screen sizes and resolutions, the parallax view images may be rescaled. FIG. 6 illustrates a schematic view of a viewing distance of the viewer affecting the actual distance of a 3D image protruding out of the display screen according to the present disclosure. Assuming the absolute parallax m remains constant, the viewing distance of the viewer T can affect or determine $S_2$.

Referring to FIG. 6, assuming the absolute parallax m remains constant, the pixels p1 and p2 of the 3D image stay at the same positions. Assuming the viewer is located at the position A and the distance between the viewer and the 3D display screen 114 is the viewing distance $T_a$, the viewer may see the 3D image appear at the point $Q_1$ protruding out of the 3D display screen 114. The distance between the point $Q_1$ and the 3D display screen 114 is $S_{2a}$.

Further, assuming the viewer changes viewing position and the viewer is now located at the position B and the distance between the viewer and the 3D display screen 114 is the viewing distance $T_b$, the viewer may see the 3D image appear at the point $Q_2$ protruding out of the 3D display screen 114. The distance between the point $Q_2$ and the 3D display screen 114 is $S_{2b}$.

Referring to FIG. 6, when the viewer views the 3D image at different positions (position A or position B), the viewer may see the 3D image protruding out of the 3D image with different maximum distances and positions even if the absolute parallax does not change. As a result, the viewer may see the 3D image from two different positions having the same absolute parallax with different 3D effects and depth perceptions. In other words, when the absolute parallax of the 3D image does not change, the 3D image position protruding out of the 3D display screen 114 may be affected by the viewing position of the viewer.

Thus, only adjusting the 3D image parallax by tracking and calculating the distance between the operating element and the display screen is insufficient to achieve a desired display effect. Referring to FIG. 6, considering equations (1) and (2), when the viewer changes the viewing position, if only making sure the distance between the operating element and the display screen is equal to the distance of the 3D image protruding out of the 3D display screen 114, the operating element appears at the point $Q_1$ while the 3D image protrudes at the point $Q_2$. The illusion of the operating element passing through the 3D image still occurs.

Thus, when the operating element maintains a constant distance away from the display screen and the viewer changes the viewing position, it is desirable for the viewer to see the 3D image maintaining a constant distance protruding out of the display screen. In other words, when the viewer moves from the position A to the position B, it is desirable that the viewer still sees the 3D image appear at the point $Q_1$ protruding out of the display screen.

Figure 7:
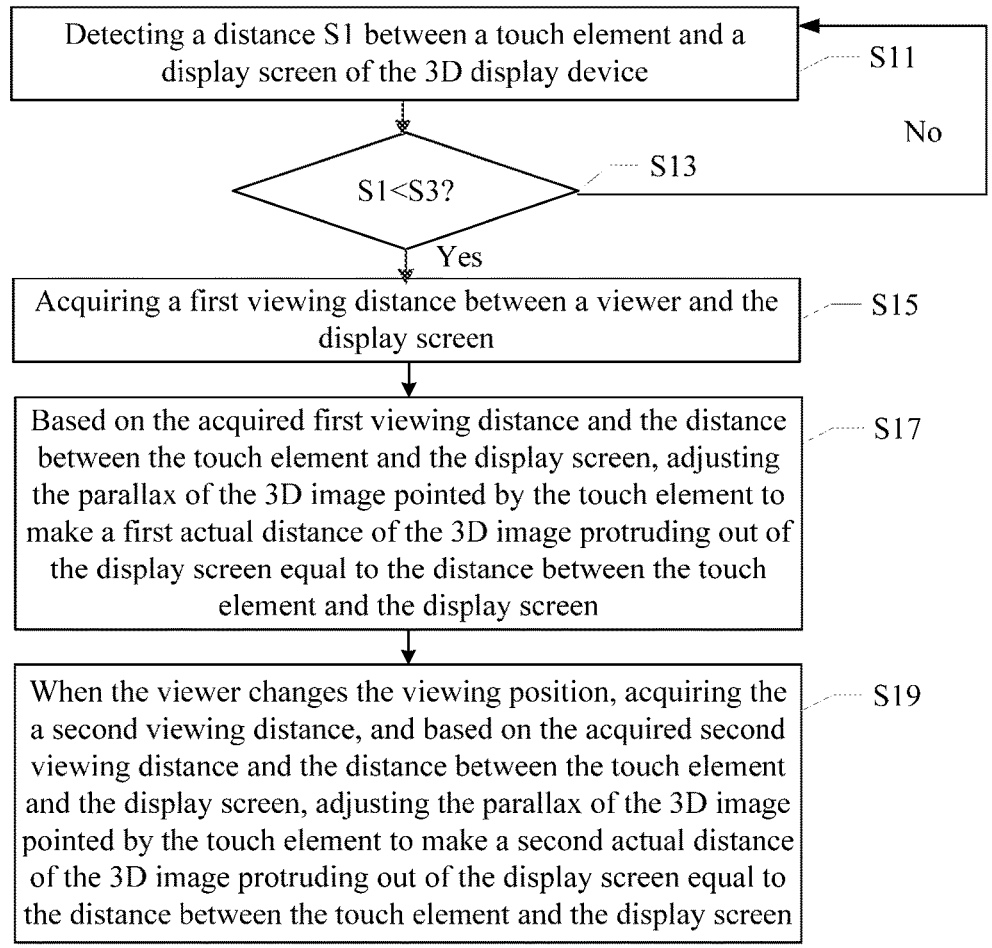
FIG. 7 illustrates a flow chart of an exemplary 3D interaction method according to the disclosed embodiments.

FIG. 7 illustrates a flow chart of an exemplary 3D interaction method according to the present disclosure. The 3D interaction method may be executed by an executing entity, for example, the 3D display device that displays 3D images. Referring to FIG. 7, the 3D interaction method according to the present disclosure may include the following steps.

Step S11: detecting the distance between the operating element and the display screen of the display device.

Firstly, the floating touch sensor 110 may detect the presence of the operating element and, if present, the distance between the operating element and the 3D display screen 114 $S_1$. When the presence of the operating element is detected and $S_1$ is acquired, the method may proceed to the step S13. Otherwise, the floating touch sensor 110 may continuously detect the presence of the operating element and, if present, the distance $S_1$ between the operating element and the 3D display screen 114.

As previously defined, the floating touch sensor 110 has a maximum sensing distance $S_0$. The distance between the operating element and the 3D display screen 114 is $S_1$. When $S_1$ is greater than $S_0$, the floating touch sensor 110 may not be able to detect the presence of the operating element. When $S_1$ is less than $S_0$, the floating touch sensor 110 may be able to detect the presence of the operating element and may detect in real time the distance $S_1$ between the operating element and the 3D display screen 114.

Step S13: determining whether the distance between the operating element and the 3D display screen is less than the maximum distance of the 3D image pointed by the operating element protruding out of the 3D display screen. When the result is positive, the process proceeds to the next step S15. When the result is negative, the process loops back to the previous step S11.

When the distance between the operating element and the 3D display screen $S_1$ is greater than or equal to the maximum distance $S_3$ of the 3D image pointed by the operating element protruding out of the 3D display screen, the illusion of the operating element passing through the 3D image may not occur. Adjusting the parallax of the 3D image pointed by the operating element is not needed.

When the distance $S_1$ between the operating element and the 3D display screen is less than the maximum distance $S_3$ of the 3D image pointed by the operating element protruding out of the 3D display screen, the illusion of the operating element passing through the 3D image may occur. Under such condition, adjusting the parallax of the 3D image pointed by the operating element is needed.

Step S15: acquiring a first viewing distance between the viewer and the 3D display screen. For example, the spatial distance detector 112 may detect the first viewing distance between the viewer and the 3D display screen 114. The first viewing distance may be used to calculate the parallax adjustment of the 3D image required in the following step.

Step S17: based on the first viewing distance and the distance between the operating element and the 3D display screen, adjusting the parallax of the 3D image pointed by the operating element to make a first actual distance of the 3D image pointed by the operating element protruding out of the 3D display screen equal to the distance between the operating element and the 3D display screen.

To achieve the effect of the operating element pressing down the 3D image, the distance between the operating element and the 3D display screen 114 may be adjusted to equal to the actual distance of the 3D image pointed by the operating element protruding out of the 3D display screen 114. Specifically, from equation (2), when the viewing distance, the distance between the operating element and the 3D display screen 114, and the interpupillary distance e of the eyes of the viewer are given, the parallax m of the 3D image may be calculated.

In this step, equation (3) below may be used to determine the adjusted parallax $m_a$ of the 3D image pointed by the operating element.

$$S_a = S_1 = m_a T_a / (m_a + e) \quad (3)$$

In equation (3), $S_1$ is the distance between the operating element and the 3D display screen 114, $T_a$ is the first viewing distance between the viewer and the 3D display screen 114, e is the interpupillary distance of the eyes of the viewer, $S_a$ is the first actual distance of the 3D image pointed by the operating element protruding out of the 3D display screen 114, and $m_a$ is the parallax of the 3D image pointed by the operating element when the distance between the viewer and the 3D display screen 114 is the first viewing distance.

Step S19: acquiring a second viewing distance between the viewer and the 3D display screen when the viewer changes the viewing position, and adjusting the parallax of the 3D image pointed by the operating element based on the acquired second viewing distance and the distance between the operating element and the 3D display screen to make the second actual distance of the 3D image pointed by the operating element protruding out of the 3D display screen equal to the distance between the operating element and the 3D display screen.

Specifically, from equation (4) below, the parallax of the 3D image may be adjusted from $m_a$ to $m_b$.

$$S_b = S_1 = m_b T_b / (m_b + e) \quad (4)$$

In equation (4), $S_1$ is the distance between the operating element and the 3D display screen 114, $T_b$ is the second viewing distance between the viewer and the 3D display screen 114, e is the interpupillary distance of the eyes of the viewer, $S_b$ is the second actual distance of the 3D image pointed by the operating element protruding out of the 3D display screen 114, and $m_b$ is the parallax of the 3D image pointed by the operating element when the distance between the viewer and the 3D display screen 114 is the second viewing distance.

Figure 8:
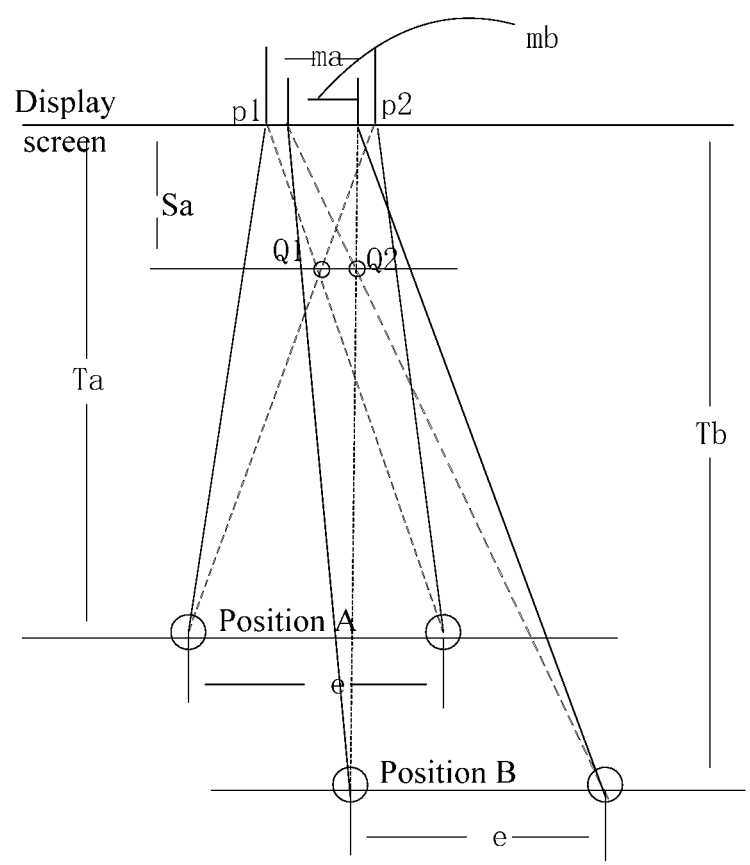
FIG. 8 illustrates a schematic view of the operation principle of an exemplary 3D interaction method according to the disclosed embodiments.

FIG. 8 illustrates a schematic view of the operation principle of an exemplary 3D interaction method according to the present disclosure. When the viewer changes the viewing position, the 3D interaction method may adjust the parallax of the 3D image as shown in FIG. 8.

Referring to FIG. 8, when the viewer is located at the position A, the parallax of the 3D image is $m_a$, and the viewing distance between the viewer and the 3D display screen 114 is the first viewing distance $T_a$. The viewer may see the 3D image pointed by the operating element at the point $Q_1$ protruding out of the 3D display screen 114. The distance between the point $Q_1$ and the 3D display screen 114 is $S_a$.

When the viewer changes the viewing position, for example, from the position A to the position B, to make the viewer see the 3D image that protrudes out of the 3D display screen 114 falling into the plane where the point $Q_1$ is located, the parallax of the 3D image needs to be adjusted. In equation (2), the viewing distance of the viewer changes from $T_a$ to $T_b$. To keep the distance $S_b$ between the point $Q_2$ and the 3D display screen 114 unchanged, equation (5) below is given.

$$S_1 = S_a = S_b = m_a T_a / (m_a + e) = m_b T_b / (m_b + e) \quad (5)$$

Specifically, to make the actual distance of the 3D image protruding out of the 3D display screen 114 equal to the distance $S_1$ between the operating element and the 3D display screen 114, the 3D display device may adjust the parallax of the 3D image pointed by the operating element protruding out of the 3D display screen 114 based on the viewing distance $T_b$ acquired in real time when the viewer is located at the position B, and the distance $S_1$ between the operating element and the 3D display screen 114. When the viewer is located at the position B, the actual distance $S_b$ of the 3D image pointed by the operating element protruding out of the 3D display screen 114 may be equal to the distance $S_1$ between the operating element and the 3D display screen 114. Thus, the effect of the operating element pressing the 3D image is achieved.

Further, after the step S19 is executed, the touch screen of the 3D display device may be triggered to select the corresponding 3D image. After the step S19 is executed, the operating element may move away from the 3D display screen 114. The 3D display device may return to the initial state and the 3D interaction process ends.

The 3D interaction method according to the present disclosure incorporates many aspects of the viewing experience of the viewer in 3D interaction, including the distance between the viewer and the 3D display screen 114, the distance between the operating element and the 3D display screen 114, the maximum distance of the 3D image pointed by the operating element protruding out of the 3D display screen 114, and the interaction among these factors. The 3D display device adjusts the parallax of the 3D image to avoid the illusion of the operating element passing through the 3D image. Thus, the dizziness, falseness, and other unpleasant experience caused by such illusion may be eliminated.

Figure 9A:
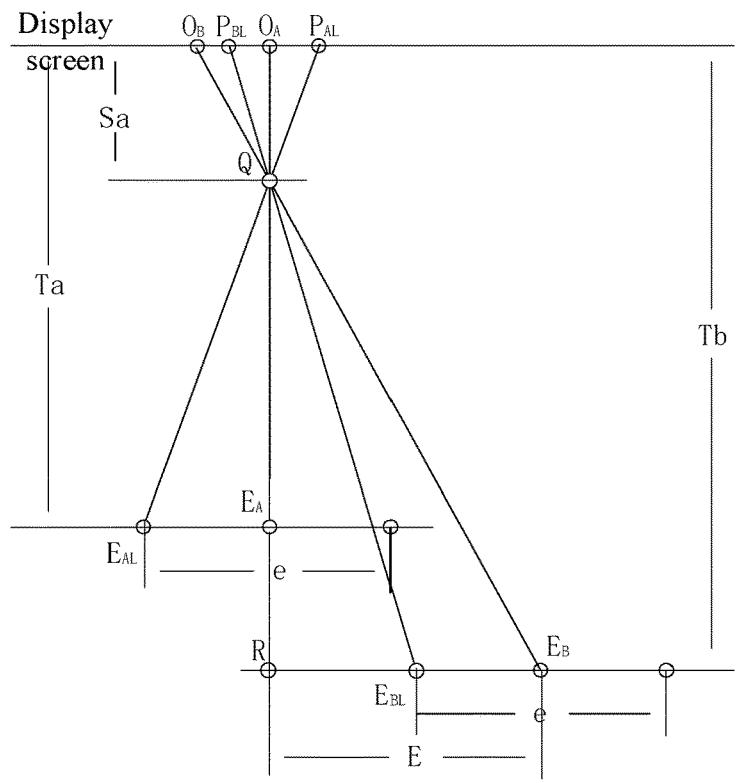
FIG. 9A illustrates a schematic view of the operation principle of another exemplary 3D interaction method according to the disclosed embodiments.
Figure 9B:
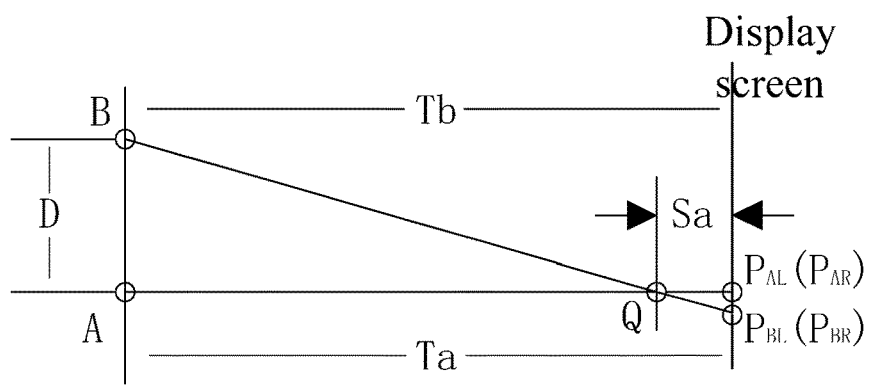
FIG. 9B illustrates a supplementary schematic view of the operation principle in FIG. 9A.

FIG. 9A illustrates a schematic view of the operation principle of another exemplary 3D interaction method according to the present disclosure. FIG. 9B illustrates a supplementary schematic view of the operation principle in FIG. 9A. This disclosed 3D interaction method may improve the previous embodiments shown in FIG. 8. Referring to FIG. 8, the parallax of the 3D image pointed by the operating element is adjusted from $m_a$ to $m_b$, although the distance of the 3D image pointed by the operating element protruding out of the 3D display screen remains unchanged, the 3D image pointed by the operating element protruding out of the 3D display screen 114 may move around in a plane parallel with the 3D display screen 114. Such movement may give the viewer the illusion that the operating element is unable to hold down the 3D image. The present disclosure provides a solution to solve such problem.

Specifically, referring to the FIG. 9A, assuming the viewer located at the position A is looking straight at the object to be operated, the center of the eyes of the viewer is located at the point $E_A$. The object to be operated appears at the point $O_A$ on the 3D display screen 114. The left eye of the viewer is located at the point $E_{AL}$. The interpupillary distance is e. The left eye sees the parallax view image at the point $P_{AL}$ on the 3D display screen 114. The left eye and the right eye combine the left eye view $P_{AL}$ and the right eye view $P_{AR}$ to form the point P on the 3D display screen 114. From the perspective of the viewer, the point P protrudes out of the 3D display screen 114 with a distance $S_a$ and appears at the point Q.

When the viewer moves the viewing position relative to the 3D display screen 114 in the left-right or front-back direction, the left eye or the right eye of the viewer may see the parallax view image moving on the 3D display screen 114 in the left direction or the right direction. Consequently, the 3D image at the point P moves on the 3D display screen 114 in the left-right direction and the 3D image at the point Q moves accordingly. To make the point P of the left and right eye parallax view images on the 3D display screen 114 appear at the same point Q, a displacement may be needed and calculated based on the changed viewing position of the viewer.

When the calculated displacement is applied, the point P of the left and right eye parallax view images on the 3D display screen 114 appears at the same point Q even when the viewer moves from the viewing position A to the viewing position B. Accompanying with FIG. 9A, the detailed description is provided to explain that the left and right eye parallax view images are displaced in the left-right direction accordingly to assure that the 3D image appears at the same position when the viewer moves the viewing position relative to the 3D display screen 114 in the left-right direction.

As shown in FIG. 9A, assuming the center of the eyes of the viewer moves from the point $E_A$ to the point $E_B$, the displacement from the left to the right is E. The corresponding point of the center of the eyes of the viewer on the 3D display screen moves from the point $O_A$ to the point $O_B$. The left eye of the viewer located at the point $E_{BL}$ sees the left eye parallax view image on the 3D display screen at the point $P_{BL}$. The displacement of the point $P_{BL}$ relative to the point $P_{AL}$ is given in equation (6) below, $$P_{BL} - P_{AL} = (O_A - P_{AL}) + (O_B - O_A) - (O_B - P_{BL}) \quad (6)$$

Equations (7) and (8) below are derived from FIGS. 6 and 8, $$(O_A - P_{AL}) = m_a/2 \quad (7)$$

$$(O_A - P_{BL}) = m_b/2 \quad (8)$$

According to the principle of similar triangles, equation (9) below is derived due to $\triangle O_A O_B Q \sim \triangle RE_B Q$, $$(O_B - O_A)/E = S_a/(T_b - S_a) \quad (9)$$

Further, equation (10) below is derived, $$(O_B - O_A) = S_a E/(T_b - S_a) \quad (10)$$

Further, equations (11) and (12) below are derived by substituting $S_a$ with equation (5), $$(O_B - O_A) = S_a E/(T_b - S_a) = E \frac{m_a T_a}{(T_b - T_a)m_a + T_b e} \quad (11)$$

$$(O_B - P_{BL}) = m_b/2 = \frac{1}{2}\frac{S_a e}{T_b - S_a} = \frac{e}{2}\frac{(m_a T_a)/(m_a + e)}{T_b - (m_a T_a)/(m_a + e)} = \frac{e}{2}\frac{m_a T_a}{(T_b - T_a)m_a + T_b e} \quad (12)$$

The relative displacement ($P_{BL} - P_{AL}$) of the parallax view image observed by the left eye of the viewer on the 3D display screen 114 is given in equation (13) below, $$(O_A - P_{AL}) + (O_B - O_A) - (O_B - P_{BL}) = S_a E/(T_b - S_a) + m_a/2 - m_b/2 \quad (13)$$

Equation (14) below is derived by substituting $S_a$ and $m_b$, and is expressed in terms of $T_a$, $m_a$, $T_b$, E, and e, $$P_{L1} = (P_{BL} - P_{AL}) = \quad (14)$$

$$E\frac{m_a T_a}{(T_b - T_a)m_a + T_b e} + m_a/2 - \frac{e}{2}\frac{m_a T_a}{(T_b - T_a)m_a + T_b e} =$$

$$m_a/2 + \left(E - \frac{e}{2}\right)\frac{m_a T_a}{(T_b - T_a)m_a + T_b e}$$

where $P_{L1}$ is the relative displacement of the parallax view image observed by the left eye of the viewer on the 3D display screen 114 in the left-right direction parallel to the 3D display screen 114.

When the viewer is located at the position A, the distance between the viewer and the 3D display screen 114 is $T_a$ and the 3D image parallax is $m_a$. Whether viewer moves from the viewing position A to the viewing position B, the relative displacement of the parallax view images on the 3D display screen 114 can be calculated based on the distances the viewer moves in the left-right and front-back directions. Equation (14) calculates $P_{L1}$, the relative displacement of the parallax view image observed by the left eye of the viewer on the 3D display screen 114 in the left-right direction parallel to the 3D display screen 114.

Similarly, the parallax view image observed by the right eye of the viewer on the 3D display screen 114 may be moved too. The relative displacement of the parallax view image observed by the right eye of the viewer on the 3D display screen 114 in the left-right direction parallel to the 3D display screen 114 is given in equation (15) below, $$P_{R1} = -m_a/2 + \left(E + \frac{e}{2}\right)\frac{m_a T_a}{(T_b - T_a)m_a + T_b e} \quad (15)$$

where $P_{R1}$ is the relative displacement of the parallax view image observed by the right eye of the viewer on the 3D display screen 114 in the left-right direction parallel to the 3D display screen 114.

Thus, when the viewer moves from viewing position A to the viewing position B, the 3D display device may be able to detect the movement E of the viewer in the left-right direction. When the viewer is located at the position A, the 3D image parallax at the position A is $m_a$, and the distance between the viewer and the 3D display screen is $T_a$. When the viewer is located at the position B, the 3D image parallax at the position B is $m_b$, and the distance between the viewer and the 3D display screen is $T_b$. The interpupillary distance of the eyes of the viewer is e. The relative displacements of the parallax view images observed by the left and right eyes of the viewer on the 3D display screen in the left-right direction parallel to the 3D display screen 114 can be calculated for the viewer located at the position B. Based on the calculated displacements, the 3D display device may rearrange the parallax view images to assure that the point P ($P_{AL}$ for the left eye and $P_{AR}$ for the right eye) corresponding to the left and right eye parallax view images on the 3D display screen 114 still appears at the point Q when the viewer moves from the viewing position A to the viewing position B. Such rearrangement eliminates the illusion that the operating element is unable to hold down the 3D image.

Further, when the 3D display device rearranges the 3D parallax view images, the left eye parallax view image and the right eye parallax view image move in the opposite direction of the movement of the viewer in the left-right direction. In other words, when the viewer moves from the left to the right in the horizontal direction, the 3D display device rearranges or adjusts the parallax by moving the left and right eye parallax view images from the right to the left, as shown in FIG. 9A.

Similarly, when the viewer moves the viewing position relative to the 3D display screen 114 in the up-down direction, the 3D display device according to the present disclosure makes the point P corresponding to the left and right eye parallax view images on the 3D display screen 114 appear at the point Q. In other words, when the viewer moves from the viewing position A to the viewing position B, the point P corresponding to the left and right eye parallax view images on the 3D display screen 114 appears at the point Q. The 3D display device calculates the parallax and the parallax displacement based on the changed viewing position of the viewer, as shown in FIG. 9B.

Referring to FIG. 9B, when the viewer is located at the viewing position A, the vertical distance between the viewer and the 3D display screen 114 is $T_a$. When the viewer is located at the viewing position B, the vertical distance between the viewer and the 3D display screen 114 is $T_b$. The distance between the viewing position A and the viewing position B is D. The left and right eye parallax view images on the 3D display screen 114 corresponding to the viewing position A are $P_{AL}$ and $P_{AR}$ respectively. The left and right eye parallax view images on the 3D display screen 114 corresponding to the viewing position B are $P_{BL}$ and $P_{BR}$ respectively. The point Q protruding out of the 3D display screen 114 corresponds to the point P on the 3D display screen 114. The distance between the point Q and the 3D display screen 114 is $S_a$. The interpupillary distance of the eyes of the viewer is e. The parallax between the left and right eye images on the 3D display screen corresponding to the viewing position A is $m_a$.

To make the image appear at the same point protruding out of the 3D display screen when the viewer moves from the viewing position A to the viewing position B, the 3D display device performs the following calculations. According to the principle of similar triangles, $\triangle ABQ \sim \triangle P_{AL}P_{BL}Q$, equation (16) below holds true, $$|P_{BL} - P_{AL}|/|B - A| = |P_{AL} - Q|/|A - Q| \quad (16)$$

When the viewer moves vertically from the viewing position A to the viewing position B, the corresponding parallax view image on the 3D display screen 114 moves in the opposite direction. The displacement is given in equation (17) below, $$|P_{BL} - P_{AL}| = |P_{AL} - Q||B - A|/|A - Q| = S_a D/(T_a - S_a) \quad (17)$$

$P_{L2}$, the relative displacement of the left eye parallax view image on the 3D display screen 114 in the up-down direction can be calculated based on equation (17) above, $$P_{L2}|P_{BL} - P_{AL}| = m_a D/e \quad (18)$$

Similarly, $P_{R2}$, the relative displacement of the right eye parallax view image on the 3D display screen 114 in the up-down direction can be calculated based on equation (17) above, $$P_{R2} = m_a D/e \quad (19)$$

When the viewer moves the viewing position vertically relative to the 3D display screen 114, to make the image appear at the same point, the 3D display device moves the left and right eye parallax view images in the opposite direction by a displacement of $m_a D/e$. The left and right eye parallax view images move in the same direction and by the same displacement.

When the viewer moves the viewing position relative to the 3D display screen 114 in any direction, such movement may be decomposed into three components, including the front-back direction component, the left-right direction component, and the up-down direction component. The equations described previously may be used to calculate the relative displacements and parallax value to adjust the left and right eye parallax view images. Regardless how the viewer moves the viewing position, the image may appear at the same position and may maintain the same distance of the image protruding out of the 3D display screen 114. Thus, the illusion of the operating element passing through or missing the 3D image can be eliminated.

Figure 10:
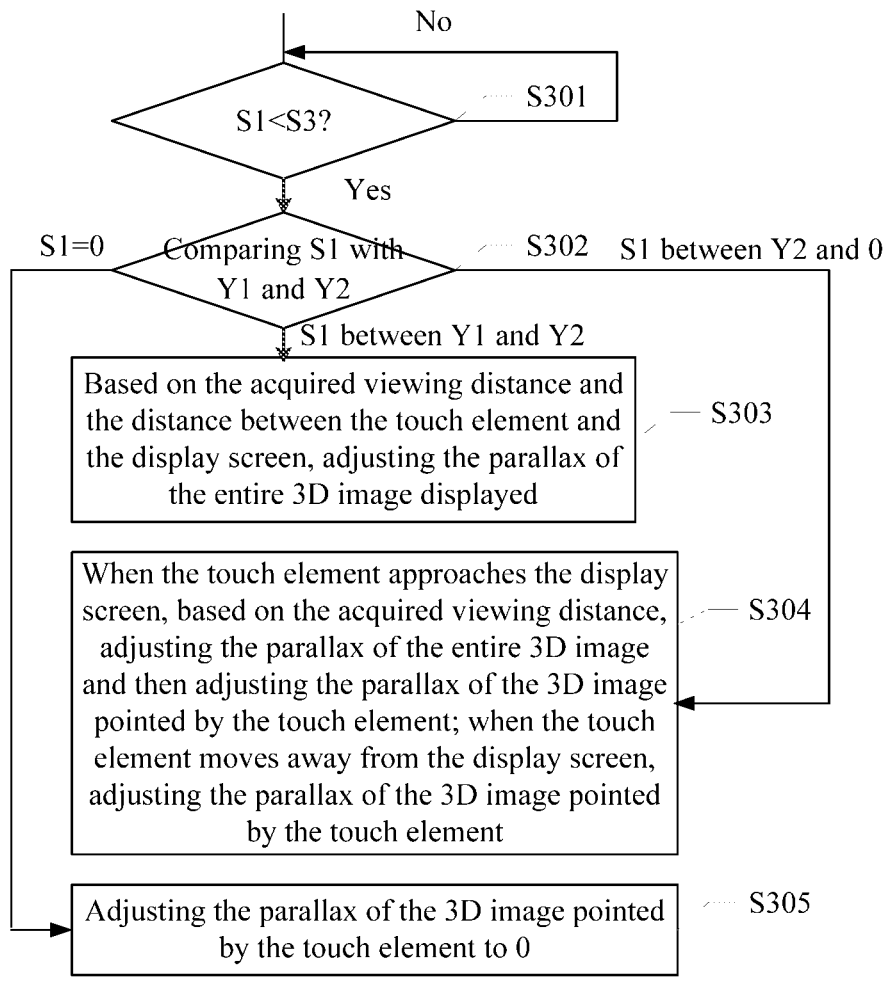
FIG. 10 illustrates a flow chart of another exemplary 3D interaction method according to the disclosed embodiments.

FIG. 10 illustrates a flow chart of another exemplary 3D interaction method according to the present disclosure. Referring to FIG. 10, when adjusting the parallax of the 3D image pointed by the operating element, the present disclosure provides two adjustment methods. One adjustment method adjusts the parallax of the entire 3D image displayed on the 3D display device. The entire 3D image includes the 3D image pointed by the operating element. The other adjustment method only adjusts the parallax of the 3D image pointed by the operating element.

Specifically, when detecting the distance $S_1$ between the operating element and the 3D display screen, the 3D display device also compares $S_1$ against a first threshold Y1 and a second threshold Y2. Based on the comparison result, the 3D display device determines the action in the next step. The first threshold Y1 is greater than the second threshold Y2. The second threshold Y2 is greater than 0. The first threshold Y1 is greater than the maximum distance of the 3D image pointed by the operating element protruding out of the 3D display screen 114. Referring to FIG. 10, in one embodiment, the 3D interaction method includes the following specific steps.

Step S301: determining whether the distance between the operating element and the 3D display screen is less than the maximum distance of the 3D image protruding out of the 3D display screen. If the result is positive, the process proceeds to the step S302. If the result is negative, the process loops back to the step S301.

Specifically, the distance between the operating element and the 3D display screen is $S_1$. The maximum distance of the 3D image protruding out of the 3D display screen is $S_3$. The 3D interaction method iteratively checks the condition $S_1 < S_3$ until the condition becomes true, and then proceeds to the next step.

Step S302: comparing the distance $S_1$ between the operating element and the 3D display screen 114 against the first threshold Y1 and the second threshold Y2. When $S_1$ is between the first threshold Y1 and the second threshold Y2, the process proceeds to the step S303. When $S_1$ is between 0 and the second threshold Y2, the process proceeds to the step S304. When $S_1$ is 0, the process proceeds to the step S305.

In this step, the first threshold Y1 is greater than the second threshold Y2, the second threshold Y2 is greater than 0, and the first threshold Y1 is greater than $S_3$. The first threshold Y1 is the threshold for adjusting the parallax of the entire 3D image on the 3D display screen 114. The second threshold Y2 is the threshold for adjusting the parallax of only the 3D image pointed by the operating element on the 3D display screen 114.

By comparing the distance $S_1$ between the operating element and the 3D display screen 114 with the first threshold Y1 and the second threshold Y2, the 3D display device determines whether to adjust the parallax of the entire 3D image or the 3D image pointed by the operating element. The parallax of the 3D image pointed by the operating element refers to the parallax of the 3D image on the 3D display screen 114 corresponding to the point where the operating element is located. The parallax of the entire 3D image refers to the parallax of the entire 3D image displayed on the 3D display screen 114.

Step S303: adjusting the parallax of the entire 3D image based on the acquired viewing distance and the distance between the operating element and the 3D display screen.

In this step, the operating element is not close enough to the 3D display screen 114. The operating element does not show clear indication of pointing to a specific portion of the 3D image. The viewing distance and the distance between the operating element and the 3D display screen are used to calculate the parallax value for the adjustment.

Step S304: adjusting the parallax of the entire 3D image, and then adjusting the parallax of the 3D image pointed by the operating element based on the viewing distance and the distance between the operating element and the 3D display screen.

In this step, the operating element is close enough to the 3D display screen. The operating element shows clear indication of pointing to a specific portion of the 3D image. The viewing distance and the distance between the operating element and the 3D display screen 114 are used to calculate the parallax value for the adjustment.

Step S305: adjusting the parallax of the 3D image pointed by the operating element to 0.

In this step, the operating element is touching the 3D display screen. It is not needed to adjust the parallax of the 3D image pointed by the operating element on the 3D display screen. Further, this step may include triggering the touch event.

Figure 11:
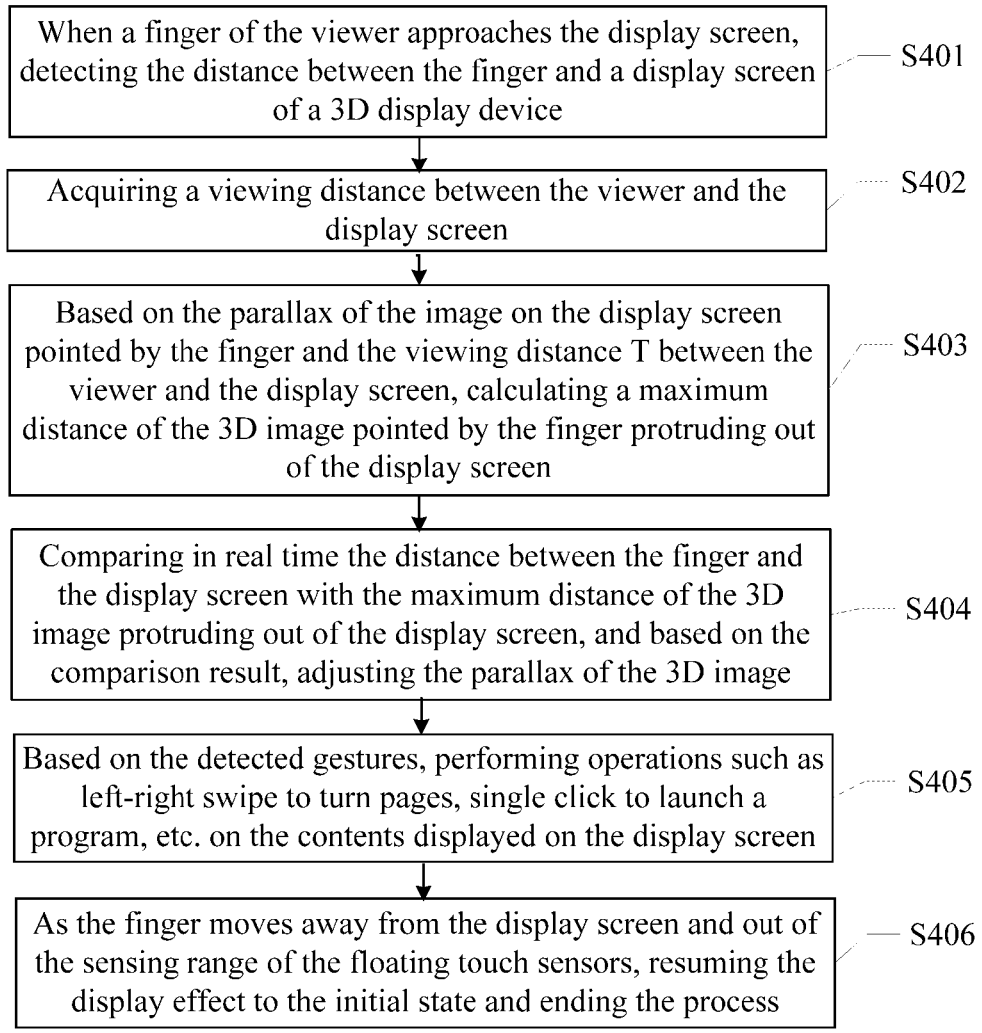
FIG. 11 illustrates a flow chart of another exemplary 3D interaction method according to the disclosed embodiments.

FIG. 11 illustrates a flow chart of another exemplary 3D interaction method according to the present disclosure. In one embodiment, human finger is used as an example of the operating element. The 3D interaction method includes the following steps.

Step S401: when the finger of the viewer approaches the 3D display screen, detecting the distance between the finger and the 3D display screen.

Step S402: acquiring the viewing distance between the viewer and the 3D display screen.

Step S403: calculating the maximum distance of the 3D image protruding out of the 3D display screen based on the parallax of the image or point on the 3D display screen corresponding to the finger and the viewing distance T between the viewer and the 3D display screen.

Step S404: comparing in real time the distance between the finger and the 3D display screen with the maximum distance of the 3D image protruding out of the 3D display screen, and adjusting the parallax of the 3D image based on the comparison result.

When the finger of the viewer approaches the 3D display screen 114, the distance $S_1$ between the operating element and the 3D display screen 114 reduces. When the distance $S_1$ between the operating element and the 3D display screen 114 is reduced to the same as the maximum distance $S_3$ of the 3D image protruding out of the 3D display screen 114, the viewer may feel the finger touching the 3D image protruding out of the 3D display screen 114.

Figure 12:
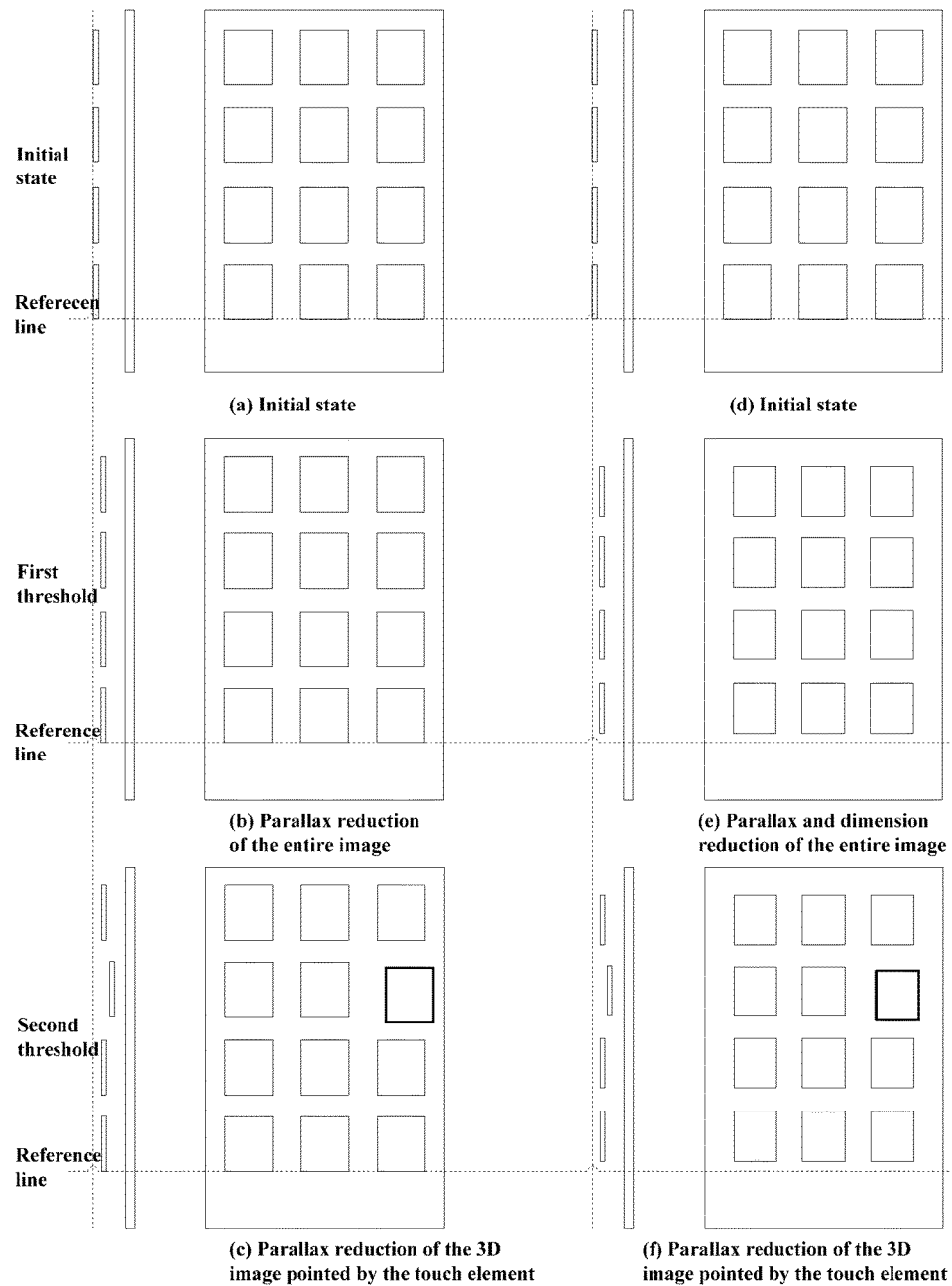
FIG. 12 illustrates a schematic view of results of the exemplary 3D interaction method in FIG. 11.

FIG. 12 illustrates a schematic view of results of the exemplary 3D interaction method in FIG. 11. As shown in FIG. 12, in one embodiment, to provide the viewer a truthful real life experience of manipulating a floating object, the 3D display device may adjust the parallax of the 3D image accordingly as the finger of the viewer continues to get closer to the 3D display screen 114 or $S_1$ value reduces. The parallax adjustment may include adjusting the parallax of the entire 3D image displayed on the 3D display screen 114 and/or adjusting the parallax of the 3D image pointed by the operating element on the 3D display screen 114.

Specifically, the 3D image parallax adjustment process includes comparing the distance between the finger and the 3D display screen 114 with the first threshold and the second threshold, wherein, the first threshold is greater than the second threshold, the second threshold is greater than 0, and the first threshold is greater than the maximum distance of the 3D image pointed by the finger protruding out of the 3D display screen 114.

Referring to FIG. 12a, in one embodiment, the 3D image is displayed on the display screen 114 in the initial state. When the distance between the finger and the 3D display screen 114 is between the first threshold and the second threshold, the process adjusts the parallax of the entire 3D image displayed on the 3D display screen 114, as shown in FIG. 12b. The 3D image displayed on the 3D display screen 114 changes along with the change of the distance between the finger and the 3D display screen 114. The process effectively maintains the condition $S_2=S_1$, which gives the viewer the impression that the finger is pressing the 3D image into the 3D display screen 114.

Alternatively, when the distance between the finger and the 3D display screen 114 is between 0 and the second threshold, based on the acquired viewing distance, the process adjusts the parallax of the entire 3D image displayed on the 3D display screen 114, and then adjusts the parallax of the 3D image pointed by the finger on the 3D display screen 114, as shown in FIG. 12c. The process first adjusts the parallax of the entire 3D image displayed on the 3D display screen 114 and then adjusts the parallax of the 3D image pointed by the finger on the 3D display screen 114 to maintain the condition $S_2=S_1$, which gives the viewer the impression that the finger is pressing the 3D image into the 3D display screen 114.

Alternatively, when the distance between the finger and the 3D display screen 114 is 0, the process adjusts the parallax of the 3D image pointed by the finger on the 3D display screen 114 to 0.

Similarly, referring to FIG. 12d, in another embodiment, the 3D image is displayed on the display screen 114 in the initial state. When the distance between the finger and the 3D display screen 114 is between the first threshold and the second threshold, the process adjusts the parallax and dimension of the entire 3D image displayed on the 3D display screen 114 in the X-Y directions, as shown in FIG. 12e. The 3D image displayed on the 3D display screen 114 changes along with the change of the distance between the finger and the 3D display screen 114. The process effectively maintains the condition $S_2=S_1$, which gives the viewer the impression that the finger is pressing the 3D image into the 3D display screen 114.

Alternatively, when the distance between the finger and the 3D display screen 114 is between 0 and the second threshold, based on the acquired viewing distance, the process adjusts the parallax and dimension of the entire 3D image displayed on the 3D display screen 114 in the X-Y directions, and then adjusts the parallax and dimension of the 3D image pointed by the finger on the 3D display screen 114 in the X-Y directions, as shown in FIG. 12f. The process first adjusts the parallax of the entire 3D image displayed on the 3D display screen 114 and then adjusts the parallax of the 3D image pointed by the finger on the 3D display screen 114 to maintain the condition $S_2=S_1$, which gives the viewer the impression that the finger is pressing the 3D image into the 3D display screen 114.

Alternatively, when the distance between the finger and the 3D display screen 114 is 0, the process adjusts the parallax of the 3D image pointed by the finger on the 3D display screen 114 to 0.

Further, returning to FIG. 11, the finger of the viewer may perform operations such as swipes, slides, and clicks to manipulate the floating object.

Further, when the process adjusts the parallax of the 3D image pointed by the finger on the 3D display screen 114 to 0, the process may trigger touch events. Because the finger of the viewer performs all the operations on the touch screen, the process adjusts the parallax of the 3D image pointed by the finger on the 3D display screen 114 to 0. At this point, the images are displayed on the 3D display screen 114 in 2D format. However, the images in 2D format may achieve a 3D-like visual effect with the help of changing light, shadow, size, perspective, and occlusion, etc.

Step S405: based on the detected gestures, performing operations such as left-right swipes to turn pages back and forth, single click to launch a program, etc., on the contents displayed on the 3D display screen.

Step S406: as the finger moves away from the 3D display screen and out of the sensing range of the floating touch sensors, returning the display effect to the initial state and ending the process.

For example, based on the acquired viewing distance and the distance between the operating element and the 3D display screen 114, the process adjusts the parallax and dimension of the 3D image pointed by the finger on the 3D display screen 114 in the X-Y directions.

Thus, the present disclosure provides a 3D interaction method that solves the problem set forth in the background section. The method takes consideration of many aspects affecting the operation experience in the 3D interaction process. These aspects include the viewing distance (the distance between the viewer and the 3D display screen), the distance between the operating element and the 3D display screen, and the maximum distance of the 3D image protruding out of the 3D display screen. Combining these aspects, the 3D display device adjusts the 3D image parallax to eliminate the dizziness, falseness and other unpleasant feelings caused by the illusion of the operating element passing through the 3D image.

Figure 13:
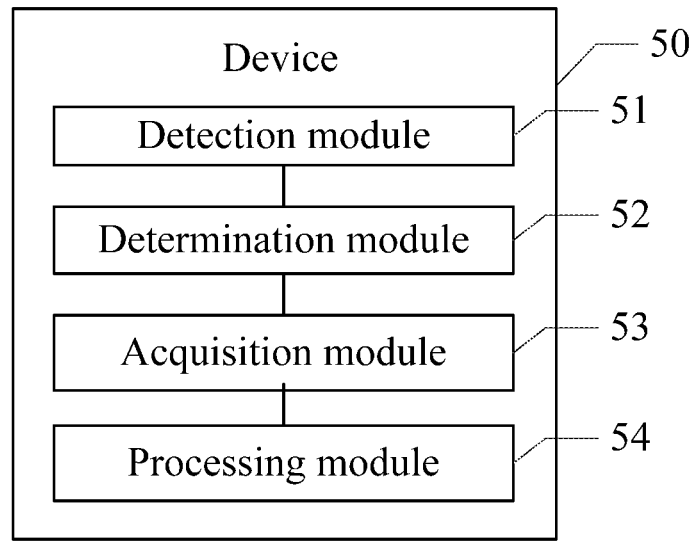
FIG. 13 illustrates a block diagram of another exemplary 3D display device according to the disclosed embodiments.
Figure 14:
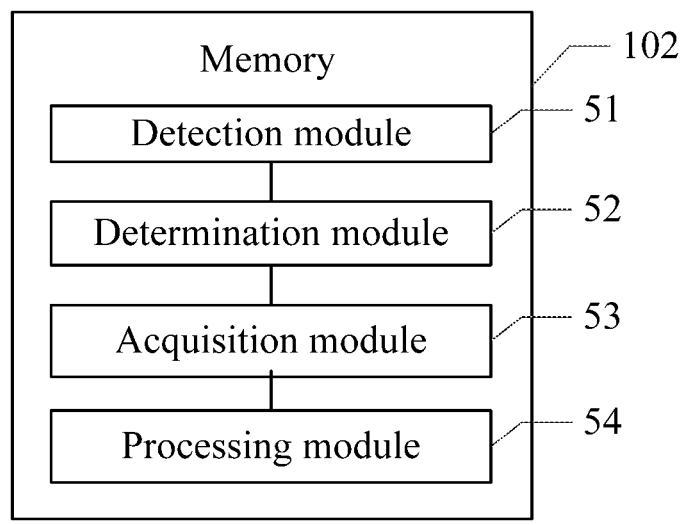
FIG. 14 illustrates a block diagram of a memory environment of the exemplary 3D display device in FIG. 13.

FIG. 13 illustrates a block diagram of another exemplary 3D display device according to the present disclosure. Referring to FIG. 13, the present disclosure provides a 3D display device 50. As shown in FIG. 14, the 3D display device 50 may be implemented in software that can be stored in the memory 102 of the 3D display device shown in FIG. 2. The 3D display device 50 may support any one of the 3D interaction processes in the various disclosed embodiments.

As shown in FIG. 13, the 3D display device 50 may include a detection module 51, a determination module 52, an acquisition module 53, and a processing module 54.

The detection module 51 is configured to detect the distance between the operating element and the display screen of the 3D display device displaying 3D images. The determination module 52 is configured to determine whether the distance detected by the detection module 51 is less than the maximum distance of the 3D image pointed by the operating element protruding out of the 3D display screen.

The acquisition module 53 is configured to acquire the viewing distance between the viewer and the 3D display screen when the determination module provides a positive result. The processing module 54 is configured to adjust the parallax of the 3D image pointed by the operating element to make the actual distance of the 3D image pointed by the operating element protruding out of the 3D display screen equal to the distance between the operating element and the 3D display screen, based on the viewing distance acquired by the acquisition module 53 and the distance between the operating element and the 3D display screen detected by the detection module 51.

Further, the acquisition module 53 may be configured to acquire the first viewing distance between the viewer and the 3D display screen 114. Specifically, the processing module 54 may be configured to adjust the parallax of the 3D image pointed by the operating element to $m_a$ based on the first viewing distance acquired by the acquisition module 53, the distance detected by the detection module 51, and equation $S_a = S_1 = m_a T_a/(m_a + e)$, wherein, $S_1$ is the distance between the operating element and the 3D display screen 114, $T_a$ is the first viewing distance between the viewer and the 3D display screen 114, e is the interpupillary distance of the eyes of the viewer, $S_a$ is the first actual distance of the 3D image pointed by the operating element protruding out of the 3D display screen 114, and $m_a$ is the parallax of the 3D image pointed by the operating element when the distance between the viewer and the 3D display screen 114 is the first viewing distance.

Further, when the viewer changes the viewing position, the acquisition module 53 is also configured to acquire a second viewing distance between the viewer and the 3D display screen 114. Specifically, the processing module 54 may also be configured to adjust the 3D image parallax from to $m_a$ to $m_b$, based on the first viewing distance acquired by the acquisition module 53, the distance detected by the detection module 51, and equation $S_b = S_1 = m_b T_b/(m_b + e)$, wherein, $S_1$ is the distance between the operating element and the 3D display screen 114, $T_b$ is the second viewing distance between the viewer and the 3D display screen 114, e is the interpupillary distance of the eyes of the viewer, $S_b$ is the second actual distance of the 3D image pointed by the operating element protruding out of the 3D display screen 114, and $m_b$ is the parallax of the 3D image pointed by the operating element when the distance between the viewer and the 3D display screen 114 is the second viewing distance.

Further, when the viewer moves the viewing position, the acquisition module 53 is also configured to acquire the displacement of the viewer relative to the 3D display screen 114 in the left-right or front-back direction. The processing module 54 is also configured to calculate the relative displacement $P_{L1}$ of the left eye parallax view image in the left-right direction on the 3D display screen 114 based on equation (14), and to calculate the relative displacement $P_{R1}$ of the right eye parallax view image in the left-right direction on the 3D display screen 114 based on equation (15), wherein E is the displacement of the viewer in the left-right direction. The processing module 54 is also configured to rearrange the parallax view images on the 3D display screen 114 based on the calculated $P_{L1}$ and $P_{R1}$ to make the 3D image formed by the parallax view images appear at the same position. When the processing module 54 rearranges the parallax view images on the 3D display screen, the parallax view images move in the opposite direction of the movement of the viewer.

Further, the acquisition module 53 is configured to acquire the displacement of the viewer relative to the 3D display screen 114 in the up-down direction. The processing module 54 is also configured to calculate the relative displacements $P_{L2}$ and $P_{R2}$ of the left and right eye parallax view images on the 3D display screen 114 in the up-down direction based on equations (18) and (19), wherein D is the displacement of the viewer relative to the 3D display screen 114 in the up-down direction. The processing module 54 is also configured to rearrange the parallax view images on the 3D display screen 114 based on the calculated $P_{L2}$ and $P_{R2}$ to make the 3D image formed by the parallax view images appear at the same position. When the processing module 54 rearranges the parallax view images on the 3D display screen 114, the parallax view images move in the opposite direction of the movement of the viewer.

Further, in one embodiment, when adjusting the parallax of the 3D image pointed by the operating element, the processing module 54 is configured to adjust the parallax of the entire 3D image displayed on the 3D display screen 114. The processing module 54 is also configured to compare the distance between the operating element and the 3D display screen 114 with the first threshold and the second threshold. The first threshold is greater than the second threshold. The second threshold is greater than 0. The first threshold is greater than the maximum distance of the 3D image pointed by the operating element protruding out of the 3D display screen 114.

When the distance between the operating element and the 3D display screen 114 is between the first threshold and the second threshold, the processing module 54 adjusts the parallax of the entire 3D image displayed on the 3D display screen 114 based on the acquired viewing distance and the distance between the operating element and the 3D display screen 114. When the distance between the operating element and the 3D display screen 114 is between 0 and the second threshold, the processing module 54 adjusts the parallax of the entire 3D image on displayed on the 3D display screen 114 based on the acquired viewing distance, and then adjusts the parallax of the 3D image pointed by the operating element based on the acquired viewing distance and the distance between the operating element and the 3D display screen 114. When the distance between the operating element and the 3D display screen 114 is 0, the processing module 54 adjusts the parallax of the 3D image pointed by the operating element to 0.

Further, in another embodiment, when adjusting the parallax of the 3D image, the processing module 54 is configured to compare the distance between the operating element and the 3D display screen 114 with the first threshold and the second threshold. The first threshold is greater than the second threshold. The second threshold is greater than 0. The first threshold is greater than the maximum distance of the 3D image pointed by the operating element protruding out of the 3D display screen 114.

When the distance between the operating element and the 3D display screen 114 is between the first threshold and the second threshold, the processing module 54 adjusts the parallax and dimension of the entire 3D image displayed on the 3D display screen 114 in the X-Y directions based on the acquired viewing distance and the distance between the operating element and the 3D display screen 114.

When the distance between the operating element and the 3D display screen is between 0 and the second threshold and the operating element approaches the 3D display screen, the processing module 54 adjusts the parallax and dimension of the entire 3D image displayed on the 3D display screen 114 in the X-Y directions based on the acquired viewing distance, and then adjusts the parallax and dimension of the 3D image pointed by the operating element on the 3D display screen 114 in the X-Y directions based on the acquired viewing distance and the distance between the operating element and the 3D display screen 114.

When the distance between the operating element and the 3D display screen 114 is between 0 and the second threshold and the operating element moves away from the 3D display screen, the processing module 54 adjusts the parallax and dimension of the 3D image pointed by the operating element on the 3D display screen 114 in the X-Y directions based on the acquired viewing distance and the distance between the operating element and the 3D display screen 114. When the distance between the operating element and the 3D display screen 114 is 0, the processing module 54 adjusts the parallax of the 3D image pointed by the operating element to 0.

The modules described above may be implemented in software program. In this case, the modules may be stored in the memory 102 of the 3D display device 100. Alternatively, the modules may be implemented in hardware such as integrated circuit chip.

The 3D display device according to the present disclosure may have the functions of these functional modules implemented in the same way as described in the previous disclosed embodiments. Other implementation details may be described in the previous disclosed embodiments as well.

Figure 15:
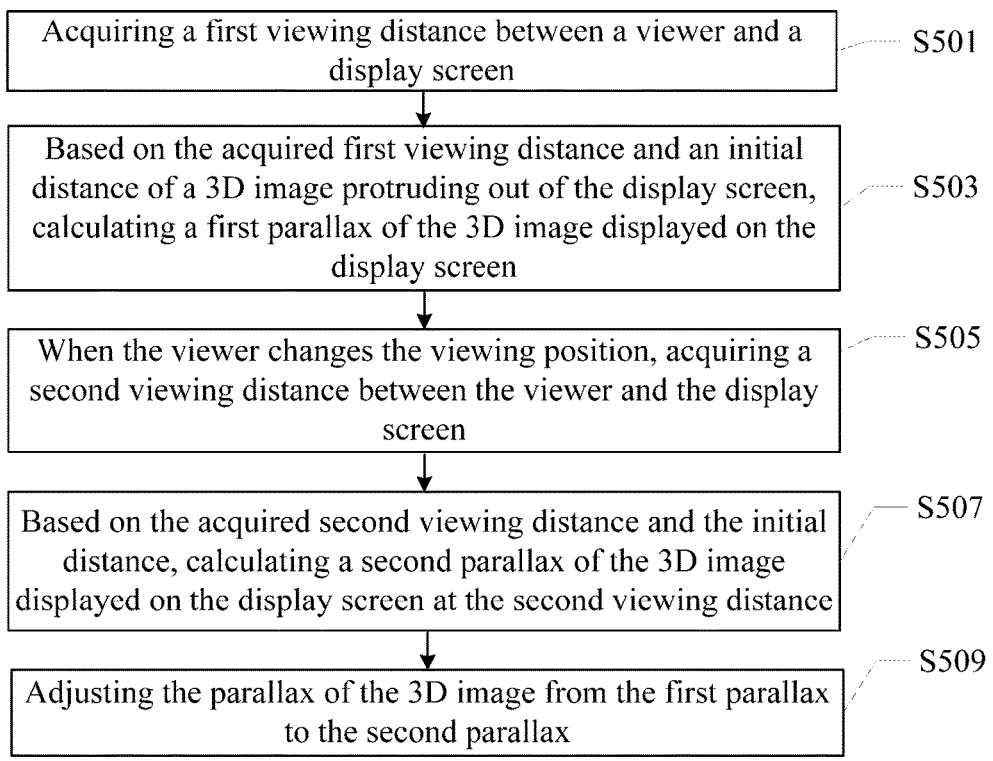
FIG. 15 illustrates a flow chart of another exemplary 3D interaction method according to the disclosed embodiments.

FIG. 15 illustrates a flow chart of another exemplary 3D interaction method according to the present disclosure. The 3D interaction method may be executed by an executing entity, for example, the 3D display device that displays 3D images. Referring to FIG. 15, the 3D interaction method according to the present disclosure may include the following steps.

Step S501: acquiring a first viewing distance between a viewer and a display screen.

In this step, the 3D display device may detect the presence of a viewer in front of a display screen 114, and may acquire a first viewing distance $T_a$ between the viewer at a first viewing position and the display screen 114.

S503: based on the acquired first distance and an initial distance of the 3D image protruding out of the display screen, calculating a first parallax of the 3D image displayed on the display screen.

When the viewing distance $T_a$, the initial distance $S_0$ of the 3D image protruding out of the display screen 114, and the interpupillary distance e of the eyes of the viewer are given, the first parallax $m_a$ of the 3D image may be calculated using equation (1).

Specifically, equation (20) below is given for calculating the first parallax $m_a$ of the 3D image.

$$S_0 = m_a T_a/(m_a + e) \quad (20)$$

The initial distance of the 3D image protruding out of the display screen 114 may be a maximum distance of the 3D image protruding out of the 3D display screen 114, or a configured distance by design. The specific value of the maximum distance of the 3D image protruding out of the 3D display screen 114 may be determined by a parallax-distance conversion module in the 3D display device. The parallax-distance conversion module calculates a spatial position of the 3D image for a point in the 3D parallax view images based on the parallax corresponding to the point in the 3D parallax view images, the viewing position of the viewer, and the distance between the viewer and the display screen 114. The distance of the 3D image protruding out of the display screen 114 corresponding to the point may be the maximum distance.

Step S505: when the viewer changes the viewing position, acquiring a second viewing distance between the viewer and the display screen.

In this step, the viewer changes the viewing position from the first viewing position to a second viewing position different from the first viewing position. The 3D display device may acquire a second viewing distance $T_b$ between the viewer at the second viewing position and the display screen 114.

Step S507: based on the acquired second viewing distance and the initial distance, calculating a second parallax of the 3D image displayed on the display screen when the viewing distance is the second viewing distance.

In this step, the 3D display device may calculate the second parallax $m_b$ of the 3D image displayed on the display screen 114 for the viewer at the second viewing position, based on the acquired second viewing distance $T_b$ and the initial distance $S_0$. Specifically, the second parallax of the 3D image when the viewing distance is the second viewing distance may be calculated by equation (21) below.

$$S_0 = m_b T_b/(m_b + e) \quad (21)$$

Step S509: adjusting the parallax of the 3D image from the first parallax to the second parallax.

In this step, the 3D display device may adjust the parallax of the 3D image displayed on the display screen 114 from the first parallax $m_a$ to the second parallax $m_b$.

Figure 16:
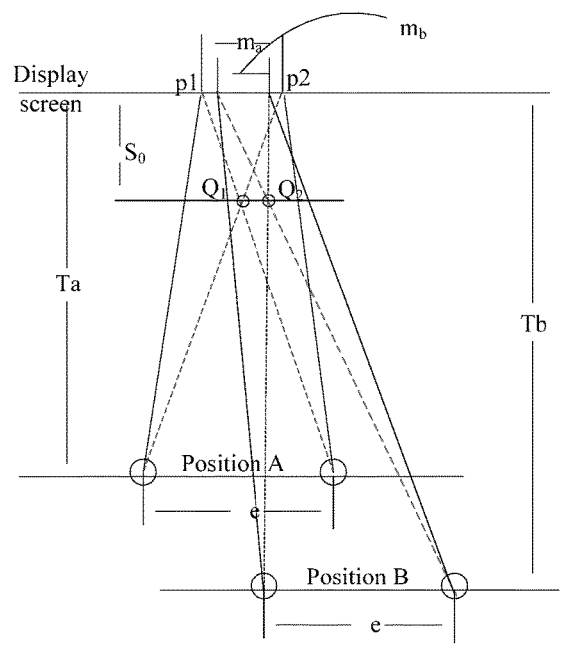
FIG. 16 illustrates a schematic view of the operation principle of another exemplary 3D interaction method according to the disclosed embodiments.

FIG. 16 illustrates a schematic view of the operation principle of another exemplary 3D interaction method according to the present disclosure. When the viewer changes the viewing position, the 3D interaction method may adjust the parallax of the 3D image as shown in FIG. 16.

Referring to FIG. 16, when the viewer is located at the position A, the parallax of the 3D image is $m_a$, and the viewing distance between the viewer and the 3D display screen 114 is the first viewing distance $T_a$. The viewer may see the 3D image pointed by the operating element at the point $Q_1$ protruding out of the 3D display screen 114. The distance between the point $Q_1$ and the 3D display screen 114 is $S_0$.

When the viewer changes the viewing position, for example, from the position A to the position B, to make the viewer see the 3D image that protrudes out of the 3D display screen 114 falling into the plane where the point $Q_1$ is located, the parallax of the 3D image needs to be adjusted. In equation (20), the viewing distance of the viewer changes from $T_a$ to $T_b$. To keep the distance $S_0$ between the point $Q_2$ and the 3D display screen 114 unchanged, equation (22) is given.

$$S_0 = m_a T_a/(m_a + e) = m_b T_b/(m_b + e) \quad (22)$$

Specifically, to make the actual distance of the 3D image protruding out of the 3D display screen 114 equal to the initial distance $S_0$, the 3D display device may adjust the parallax of the 3D image based on the viewing distance $T_b$ acquired in real time when the viewer is located at the position B, and the initial distance $S_0$ of the 3D image protruding out of the display screen 114. When the viewer is located at the position B, the actual distance of the 3D image protruding out of the 3D display screen 114 may be equal to the initial distance $S_0$.

The 3D interaction method according to the present disclosure incorporates many aspects of the viewing experience of the viewer in 3D interaction, such as the effect of the distance between the viewer and the display screen on the 3D image display. The 3D display device may adjust the parallax of the 3D image based on the viewing distance acquired in real time, and the initial distance of the 3D image protruding out of the display screen. When the viewer changes the viewing position, the actual distance of the 3D image protruding out of the 3D display screen may be equal to the initial distance. The 3D interaction method may illuminate the problem that the distance and position of the 3D image protruding out of the display screen changes when the viewer changes the viewing position.

Figure 17:
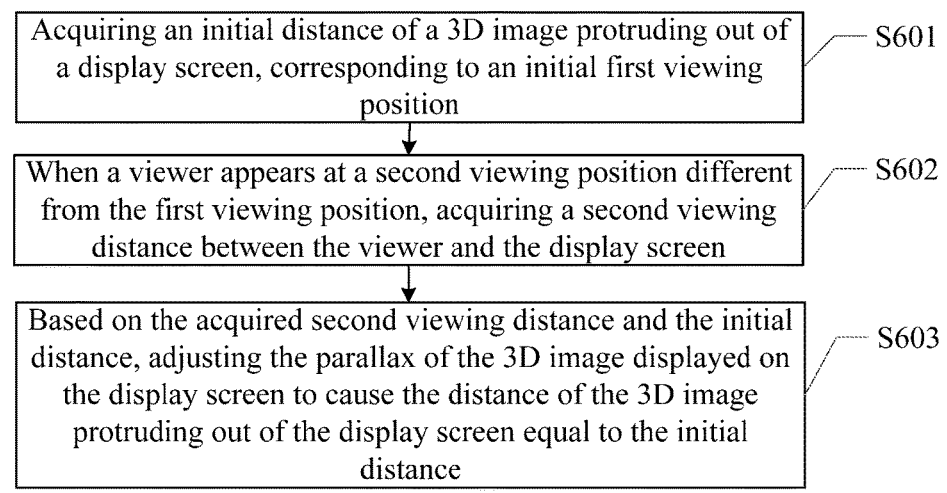
FIG. 17 illustrates a flow chart of another exemplary 3D interaction method according to the disclosed embodiments.

FIG. 17 illustrates a flow chart of another exemplary 3D interaction method according to the present disclosure. Referring to FIG. 17, the 3D interaction method according to the present disclosure may include the following steps.

Step S601: acquiring an initial distance of a 3D image protruding out of a display screen, corresponding to an initial first viewing position.

In this step, the 3D display device may acquire an initial distance of a 3D image protruding out of a display screen 114. The initial distance may correspond to an initial first viewing position of an assumed viewer.

Step S602: when the viewer appears at a second viewing position different from the first viewing position, acquiring the viewing distance between the viewer and the display screen.

In this step, when the viewer appears at a second viewing position different from the first viewing position, the 3D display device may acquire the viewing distance between the viewer at the second viewing position and the display screen 114.

Step S603: based on the acquired viewing distance and the initial distance, adjusting the parallax of the 3D image displayed on the display screen to cause the distance of the 3D image protruding out of the display screen equal to the initial distance.

Further, based on the acquired viewing distance and the initial distance, adjusting the parallax of the 3D image displayed on the display screen 114 may include calculating the parallax $m_b$ of the 3D image when the viewer is located at the second viewing position based on equation $S_0=m_b T_b/(m_b+e)$, and adjusting the parallax of the 3D image to $m_b$, wherein, e is the interpupillary distance of the eyes of the viewer, $S_0$ is the initial distance of the 3D image protruding out of the 3D display screen 114, and $T_b$ is the second viewing distance between the viewer and the 3D display screen 114.

Further, when the viewer changes the viewing position from the first viewing position to the second viewing position different from the first viewing position, the 3D interaction method further includes acquiring the displacement of the viewer relative to the 3D display screen 114 in the left-right or front-back direction, calculating the relative displacement $P_{L1}$ of the left eye parallax view image in the left-right direction on the 3D display screen 114 based on equation (14), calculating the relative displacement $P_{R1}$ of the right eye parallax view image in the left-right direction on the 3D display screen 114 based on equation (15), wherein E is the displacement of the viewer in the left-right direction, and rearranging the parallax view images on the 3D display screen 114 based on the calculated $P_{L1}$ and $P_{R1}$ to make the 3D image formed by the parallax view images appear at the same position, wherein, $m_a$ is the parallax of the 3D image corresponding to the initial distance of the 3D image protruding out of the 3D display screen 114, and $T_a$ is the viewing distance when the viewer is located at the initial first viewing position. When the 3D display device rearranges the parallax view images on the 3D display screen 114, the parallax view images move in the opposite direction of the movement of the viewer.

Further, when the viewer changes the viewing position from the first viewing position to the second viewing position different from the first viewing position, the 3D interaction method further includes acquiring the displacement D of the viewer relative to the 3D display screen 114 in the up-down direction, calculating the relative displacements $P_{L2}$ and $P_{R2}$ of the left and right eye parallax view images on the 3D display screen 114 in the up-down direction based on equations (18) and (19), and rearranging the parallax view images on the 3D display screen 114 based on the calculated $P_{L2}$ and $P_{R2}$ to make the 3D image formed by the parallax view images appear at the same position. When the 3D display device rearranges the parallax view images on the 3D display screen 114, the parallax view images move in the opposite direction of the movement of the viewer.

Figure 18:
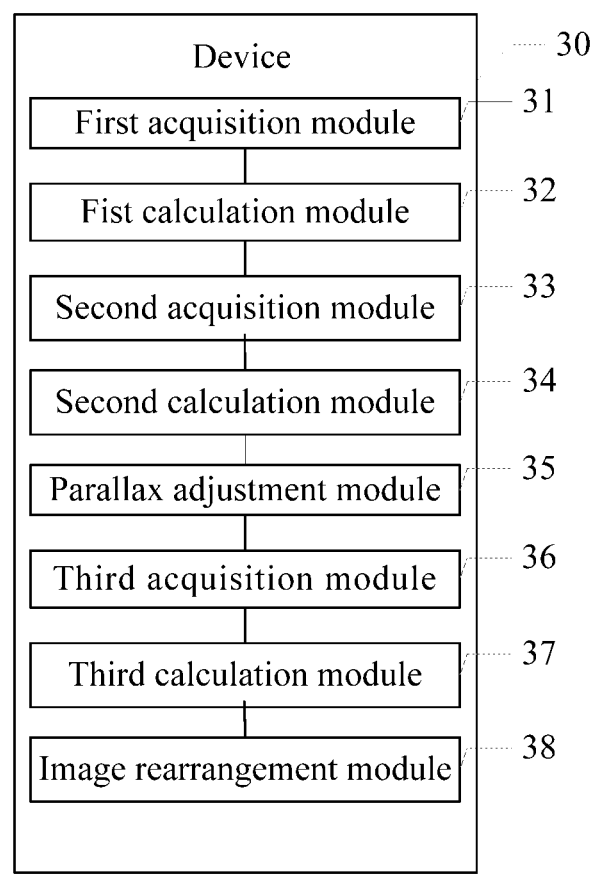
FIG. 18 illustrates a block diagram of another exemplary 3D display device according to the disclosed embodiments.
Figure 19:
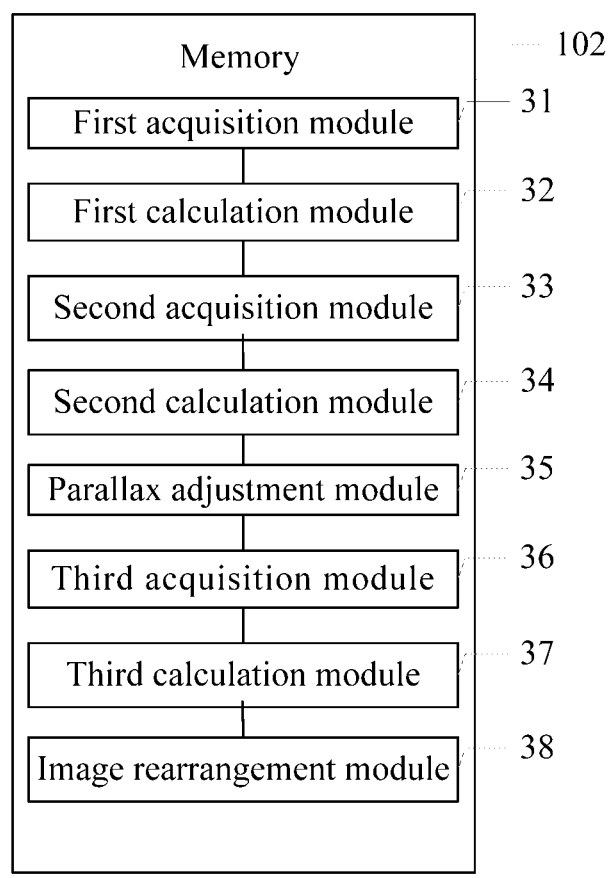
FIG. 19 illustrates a block diagram of a memory environment of the exemplary 3D display device in FIG. 18.

FIG. 18 illustrates a block diagram of another exemplary 3D display device according to the present disclosure. FIG. 19 illustrates a block diagram of a memory environment of the exemplary 3D display device in FIG. 18. Referring to FIG. 18, the present disclosure provides a 3D display device 30. As shown in FIG. 19, the 3D display device 30 may be implemented in software that can be stored in the memory 102 of the 3D display device shown in FIG. 2. The 3D display device 30 may support any one of the 3D interaction processes in the various disclosed embodiments.

As shown in FIG. 18 and FIG. 19, the 3D display device 30 may include a first acquisition module 31, a first calculation module 32, a second acquisition module 33, a second calculation module 34, and a parallax adjustment module 35.

The first acquisition module 31 is configured to acquire a first viewing distance between a viewer and a display screen 114. The first calculation module 32 is configured to calculate a first parallax of the 3D image displayed on the display screen 114 based on the acquired first viewing distance and the initial distance of the 3D image protruding out of the display screen.

The second acquisition module 33 is configured to acquire a second viewing distance between the viewer and the display screen 114 when the viewer changes the viewing position. The second calculation module 34 is configured to calculate a second parallax of the 3D image displayed on the display screen 114 based on the acquired second viewing distance and the initial distance when the viewing distance is the second viewing distance.

The parallax adjustment module 35 is configured to adjust the parallax of the 3D image from the first parallax to the second parallax.

Specifically, the first calculation module 32 may be configured to calculate the first parallax based on equation figured $S_0=m_a T_a/(m_a+e)$, wherein, e is the interpupillary distance of the eyes of the viewer, $S_0$ is the initial distance of the 3D image protruding out of the display screen 114, $m_a$ is the parallax of the 3D image when the distance between the viewer and the 3D display screen 114 is the first viewing distance, and $T_a$ is the first viewing distance between the viewer and the 3D display screen 114.

The second calculation module 34 may be configured to calculate the second parallax based on equation $S_0=m_b T_b/(m_b+e)$, wherein, e is the interpupillary distance of the eyes of the viewer, $S_0$ is the initial distance of the 3D image protruding out of the display screen 114, $m_b$ is the parallax of the 3D image when the distance between the viewer and the 3D display screen 114 is the second viewing distance, and $T_b$ is the second viewing distance between the viewer and the 3D display screen 114.

Further, as shown in FIG. 18 and FIG. 19, the 3D display device 30 may also include a third acquisition module 36, a third calculation module 37, and am image rearrangement module 38.

The third acquisition module 36 is configured to acquire the displacement of the viewer in a first direction. The first direction is parallel with a plane where the 3D display screen 114 is located.

The third calculation module 37 is configured to calculate the relative displacement $P_{L1}$ of the left eye parallax view image on the 3D display screen 114 based on equation (14), and to calculate the relative displacement $P_{R1}$ of the right eye parallax view image on the 3D display screen 114 based on equation (15), wherein E is the displacement of the viewer relative to the display screen 114 in the left-right or front-back direction.

The image rearrangement module 38 is configured to rearrange the parallax view images on the 3D display screen 114 based on the calculated $P_{L1}$ and $P_{R1}$ to make the 3D image formed by the parallax view images appear at the same position. When the image rearrangement module 38 rearranges the parallax view images on the 3D display screen, the parallax view images move in the opposite direction of the movement of the viewer.

Further, the third acquisition module 36 is configured to acquire the displacement of the viewer relative to the 3D display screen 114 in the up-down direction.

The third calculation module 37 is configured to calculate the relative displacements $P_{L2}$ and $P_{R2}$ of the left and right eye parallax view images on the 3D display screen 114 in the up-down direction based on equations (18) and (19), wherein D is the displacement of the viewer relative to the 3D display screen 114 in the up-down direction.

The image rearrangement module 38 is configured to rearrange the parallax view images on the 3D display screen 114 based on the calculated $P_{L2}$ and $P_{R2}$ to make the 3D image formed by the parallax view images appear at the same position. When the image rearrangement module 38 rearranges the parallax view images on the 3D display screen 114, the parallax view images move in the opposite direction of the movement of the viewer.

The modules described above may be implemented in software program. In this case, the modules may be stored in the memory 102 of the 3D display device 100. Alternatively, the modules may be implemented in hardware such as integrated circuit chip.

The 3D display device according to the present disclosure may have the functions of these functional modules implemented in the same way as described in the previous disclosed embodiments. Other implementation details may be described in the previous disclosed embodiments as well.

Further, the descriptions of the various embodiments are provided in a progressive manner. In each individual embodiment description, the emphasis is placed on the differentiations and unique characteristics as compared to other disclosed embodiments. References are provided for the common aspects between the various disclosed embodiments. Similar descriptions are not repeated. For the 3D display device, because the implementation method is similar to other disclosed embodiments, only a brief description along with references to previous disclosed embodiments is provided.

The terms "comprising", "including", and other variations thereof are non-exclusive inclusion. Such statements not only include a plurality of elements such as process, method, object, or device, but also include other elements that are not explicitly listed. Further, such statements also intend to include any other elements inherent to those listed elements. In absence of more descriptive constraints, a statement "includes a . . . " includes a plurality of elements such as process, method, object, or device, but does not exclude any other similar elements that are not listed.

Those skilled in the art can understand that all or some aspects of the present disclosure may be implemented in hardware or in software programs that provide instructions to hardware. Software programs may be stored in a computer accessible storage media. The storage media may include read-only memory, hard disk, or optical disk, etc.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A 3D interaction method for displaying 3D images on a 3D display device, comprising:
   detecting a distance between an operating element touching a display screen of the 3D display device and the display screen of the 3D display device;
   determining whether the distance between the operating element and the display screen is less than a maximum distance of a 3D image pointed by the operating element protruding out of the display screen;
   when the distance between the operating element and the display screen is less than a maximum distance, acquiring a viewing distance between a viewer and the display screen; and
   based on the acquired viewing distance and the distance between the operating element and the display screen, adjusting a parallax of the 3D image pointed by the operating element to cause an actual distance of the 3D image pointed by the operating element protruding out of the display screen equal to the distance between the operating element and the display screen.

2. The 3D interaction method of claim 1, further including acquiring a first viewing distance between the viewer and the display screen.

3. The 3D interaction method of claim 2, wherein adjusting the parallax of the 3D image pointed by the operating element based on the acquired viewing distance and the distance between the operating element and the display screen further includes:
   calculating an adjustment parallax $m_a$ using equation $S_a = S_1 = m_a T_a/(m_a + e)$; and
   adjusting the parallax of the 3D image pointed by the operating element to the calculated adjustment parallax $m_a$, wherein:
   $S_1$ is a distance between the operating element and the display screen;
   $T_a$ is a first viewing distance between the viewer and the display screen;
   e is an interpupillary distance of the eyes of the viewer; and
   $S_a$ is a first actual distance of the 3D image pointed by the operating element protruding out of the display screen.

4. The 3D interaction method of claim 3, further including:
   acquiring a second viewing distance between the viewer and the display screen when the viewer changes the viewing position.

5. The 3D interaction method of claim 4, wherein adjusting the parallax of the 3D image pointed by the operating element based on the acquired viewing distance and the distance between the operating element and the display screen further includes:

calculating an adjustment parallax $m_b$ using equation $S_b = S_1 = m_b T_b/(m_b + e)$; and adjusting the parallax of the 3D image pointed by the operating element from $m_a$ to the calculated adjustment parallax $m_b$, wherein:

$T_b$ is a second viewing distance between the viewer and the display screen; and $S_b$ is a second actual distance of the 3D image pointed by the operating element protruding out of the display screen.

6. The 3D interaction method of claim 5, when the viewer changes the viewing position, further including:

acquiring a displacement E of the viewer relative to the display screen in a left-right or front-back direction;

calculating a relative displacement $P_{L1}$ of a left eye parallax view image on the display screen in the left-right direction based on equation $$P_{L1} = m_a/2 + \left(E - \frac{e}{2}\right)\frac{m_a T_a}{(T_b - T_a)m_a + T_b e};$$

calculating a relative displacement $P_{R1}$ of a right eye parallax view image on the display screen in the left-right direction based on equation $$P_{R1} = -m_a/2 + \left(E + \frac{e}{2}\right)\frac{m_a T_a}{(T_b - T_a)m_a + T_b e};$$

and based on $P_{L1}$ and $P_{R1}$, rearranging the left eye and right eye parallax view images displayed on the display screen to make a position of the 3D image formed by the left eye and right eye parallax view images appear at the same position, wherein the left eye and right eye parallax view images move by the displacements $P_{L1}$ and $P_{R1}$ in an opposite direction of viewing position movement of the viewer.

7. The 3D interaction method of claim 5, when the viewer changes the viewing position, further including:

acquiring a displacement D of the viewer relative to the display screen in an up-down direction;

calculating relative displacements $P_{L2}$ and $P_{R2}$ of a left or right eye parallax view image on the display screen in the up-down direction based on equation $P_{L2} = P_{R2} = m_a D/e$; and based on $P_{L2}$ and $P_{R2}$, rearranging the left eye and right eye parallax view images displayed on the display screen to make a position of the 3D image formed by the left eye and right eye parallax view images appear at the same position, wherein the left eye and right eye parallax view images move by the displacements $P_{L2}$ and $P_{R2}$ in an opposite direction of viewing position movement of the viewer.

8. The 3D interaction method of claim 1, wherein adjusting the parallax of the 3D image includes:

comparing the distance between the operating element and the display screen with a first threshold and a second threshold, wherein the first threshold>the second threshold>0 and the first threshold>the maximum distance of the 3D image pointed by the operating element protruding out of the display screen; and when the distance between the operating element and the display screen is between the first threshold and the second threshold, adjusting the parallax of an entire 3D image displayed on the display screen based on the acquired viewing distance and the distance between the operating element and the display screen and, when the distance between the operating element and the display screen is between 0 and the second threshold and the operating element approaches the display screen, adjusting the parallax of the entire 3D image displayed on the 3D display screen based on the acquired viewing distance, and then adjusting the parallax of the 3D image pointed by the operating element based on the acquired viewing distance and the distance between the operating element and the display screen and, when the distance between the operating element and the display screen is between 0 and the second threshold and the operating element moves away from the display screen, adjusting the parallax of the 3D image pointed by the operating element based on the acquired viewing distance and the distance between the operating element and the display screen and, when the distance between the operating element and the display screen is 0, adjusting the parallax of the 3D image pointed by the operating element to 0.

9. The 3D interaction method of claim 8, wherein adjusting the parallax of the 3D image further includes:

adjusting the parallax and a dimension of the entire 3D image on the display screen in an X-Y direction based on the acquired viewing distance and the distance between the operating element and the display screen; and adjusting the parallax and the dimension of the 3D image pointed by the operating element on the display screen in the X-Y direction based on the acquired viewing distance and the distance between the operating element and the display screen.

10. A 3D display device for displaying 3D images, comprising:

a plurality of floating touch sensors configured to detect a distance between an operating element touching a display screen and the display screen;

a spatial distance detector configured to acquire a viewing distance between a viewer and the display screen;

a 3D display screen configured to display 3D images; and at least one processor configured to determine whether the distance between the operating element and the display screen is less than a maximum distance of a 3D image pointed by the operating element protruding out of the display screen and, based on the viewing distance acquired by the spatial distance detector and the distance detected by the plurality of floating touch sensors, to adjust a parallax of a 3D image pointed by the operating element to cause the actual distance of the 3D image pointed by the operating element protruding out of the display screen equal to the distance between the operating element and the display screen.

11. The 3D display device of claim 10, wherein:

the spatial distance detector is configured to acquire a first viewing distance between the viewer and the display screen; and the processor is configured to:

calculate an adjustment parallax $m_a$ using equation $S_a = S_1 = m_a T_a/(m_a + e)$; and adjust the parallax of the 3D image pointed by the operating element to the calculated adjustment parallax $m_a$, wherein:

$S_1$ is a distance between the operating element and the display screen;

$T_a$ is a first viewing distance between the viewer and the display screen;

e is an interpupillary distance of the eyes of the viewer; and $S_a$ is a first actual distance of the 3D image pointed by the operating element protruding out of the display screen.

12. The 3D display device of claim 11, wherein:
the spatial distance detector is configured to acquire a second viewing distance between the viewer and the display screen when the viewer changes the viewing position; and
the processor is configured to:
calculate an adjustment parallax $m_b$ using equation $S_b=S_1=m_b T_b/(m_b+e)$; and
adjust the parallax of the 3D image pointed by the operating element from $m_a$ to the calculated adjustment parallax $m_b$, wherein:
   $T_b$ is a second viewing distance between the viewer and the display screen; and
   $S_b$ is a second actual distance of the 3D image pointed by the operating element protruding out of the display screen.

13. The 3D display device of claim 11, wherein:
when the viewer changes the viewing position, the spatial distance detector is also configured to acquire the displacement E of the viewer relative to the 3D display screen in the left-right or front-back direction;
the processor is also configured to calculate the relative displacement $P_{L1}$ of the left eye parallax view image on the display screen in the left-right direction based on equation $$P_{R1} = -m_a/2 + \left(E + \frac{e}{2}\right)\frac{m_a T_a}{(T_b - T_a)m_a + T_b e};$$

the processor is also configured to calculate the relative displacement $P_{R1}$ of the right eye parallax view image on the display screen in the left-right direction based on equation $$P_{L1} = m_a/2 + \left(E - \frac{e}{2}\right)\frac{m_a T_a}{(T_b - T_a)m_a + T_b e};$$

and
based on $P_{L1}$ and $P_{R1}$, the processor is also configured to rearrange the parallax view images displayed on the display screen to make the position of the 3D image formed by the parallax view images appear at the same position, wherein the parallax view images move by the displacements $P_{L1}$ and $P_{R1}$ in the opposite direction of the viewing position movement of the viewer.

14. The 3D display device of claim 13, wherein:
when the viewer changes the viewing position, the spatial distance detector is also configured to acquire the displacement D of the viewer relative to the display screen in the up-down direction;
the processor is also configured to calculate the relative displacements $P_{L2}$ and $P_{R2}$ of the left or right eye parallax view image on the display screen in the up-down direction based on equation $P_{L2}=P_{R2}=m_a D/e$; and
based on $P_{L2}$ and $P_{R2}$, the processor is also configured to rearrange the parallax view images displayed on the display screen to make the position of the 3D image formed by the parallax view images appear at the same position, wherein the parallax view images move by the displacements $P_{L2}$ and $P_{R2}$ in the opposite direction of the viewing position movement of the viewer.

15. The 3D display device of claim 10, wherein, to adjust the parallax of the 3D image, the processor is configured to:
compare the distance between the operating element and the display screen with a first threshold and a second threshold, wherein the first threshold>the second threshold>0 and the first threshold>the maximum distance of the 3D image pointed by the operating element protruding out of the display screen; and
when the distance between the operating element and the display screen is between the first threshold and the second threshold, adjust the parallax of the entire 3D image displayed on the display screen based on the acquired viewing distance and the distance between the operating element and the display screen and,
when the distance between the operating element and the display screen is between 0 and the second threshold and the operating element approaches the display screen, adjust the parallax of the entire 3D image displayed on the 3D display screen based on the acquired viewing distance, and then to adjust the parallax of the 3D image pointed by the operating element based on the acquired viewing distance and the distance between the operating element and the display screen and,
when the distance between the operating element and the display screen is between 0 and the second threshold and the operating element moves away from the display screen, adjust the parallax of the 3D image pointed by the operating element based on the acquired viewing distance and the distance between the operating element and the display screen and,
when the distance between the operating element and the display screen is 0, adjust the parallax of the 3D image pointed by the operating element to 0.

16. The 3D display device of claim 15, wherein the processor is further configured to:
adjust the parallax and the dimension of the entire 3D image on the display screen in the X-Y direction based on the acquired viewing distance and the distance between the operating element and the display screen; and
adjust the parallax and the dimension of the 3D image pointed by the operating element on the display screen in the X-Y direction based on the acquired viewing distance and the distance between the operating element and the display screen.

17. A 3D interaction method for displaying 3D images on a 3D display device, comprising:
acquiring an initial distance of a 3D image displayed on a display screen protruding out of the display screen;
acquiring a first viewing distance corresponding to a first viewing position based on the initial distance of the 3D image protruding out of the display screen;
when a viewer appears at a second viewing position different from the first viewing position, acquiring a second viewing distance between the viewer and the display screen; and
based on the acquired second viewing distance and the initial distance of the 3D image protruding out of the display screen, adjusting a parallax of the 3D image displayed on the display screen to cause the distance of the 3D image protruding out of the display screen equal to the initial distance.

18. The 3D interaction method of claim 17, wherein adjusting the parallax of the 3D image displayed on the display screen based on the acquired second viewing distance and the initial distance of the 3D image protruding out of the display screen further includes:
   calculating an adjustment parallax $m_b$ when the viewer appears at the second viewing position using equation $S_0 = m_b T_b/(m_b + e)$; and
   adjusting the parallax of the 3D image displayed on the display screen to the calculated adjustment parallax $m_b$, wherein:
   e is an interpupillary distance of the eyes of the viewer;
   $S_0$ is the initial distance of the 3D image protruding out of the display screen; and
   $T_b$ is a second viewing distance between the viewer and the display screen.

19. The 3D interaction method of claim 18, when the viewer appears at the second viewing position different from the first viewing position, further including:
   acquiring a displacement E of the viewer relative to the display screen in a left-right or front-back direction;
   calculating a relative displacement $P_{L1}$ of a left eye parallax view image on the display screen in the left-right direction based on equation $$P_{L1} = m_a/2 + \left(E - \frac{e}{2}\right)\frac{m_a T_a}{(T_b - T_a)m_a + T_b e},$$

wherein, $m_a$ is a parallax of the 3D image corresponding to the initial distance of the 3D image protruding out of the display screen, and $T_a$ is a first viewing distance between an assumed viewer at the first viewing position and the display screen;

calculating a relative displacement $P_{R1}$ of a right eye parallax view image on the display screen in the left-right direction based on equation $$P_{R1} = -m_a/2 + \left(E + \frac{e}{2}\right)\frac{m_a T_a}{(T_b - T_a)m_a + T_b e};$$

and
   based on $P_{L1}$ and $P_{R1}$, rearranging the left eye and right eye parallax view images displayed on the display screen to make a position of the 3D image formed by the left eye and right eye parallax view images appear at the same position, wherein the left eye and right eye parallax view images move by the displacements $P_{L1}$ and $P_{R1}$ in an opposite direction of viewing position movement of the viewer.

20. The 3D interaction method of claim 18, when the viewer appears at the second viewing position different from the first viewing position, further including:
   acquiring a displacement D of the viewer relative to the display screen in an up-down direction;
   calculating relative displacements $P_{L2}$ and $P_{R2}$ of a left or right eye parallax view image on the display screen in the up-down direction based on equation $P_{L2} = P_{R2} = m_a D/e$; and
   based on $P_{L2}$ and $P_{R2}$, rearranging the left eye and right eye parallax view images displayed on the display screen to make a position of the 3D image formed by the left eye and right eye parallax view images appear at the same position, wherein the left eye and right eye parallax view images move by the displacements $P_{L2}$ and $P_{R2}$ in an opposite direction of viewing position movement of the viewer.

* * * * *